United States Patent
Hatazawa et al.

(10) Patent No.: US 10,894,385 B2
(45) Date of Patent: Jan. 19, 2021

(54) OPTICAL REFLECTIVE FILM

(71) Applicant: KONICA MINOLTA, INC., Chiyoda-ku Tokyo (JP)

(72) Inventors: Shota Hatazawa, Chiyoda-ku Tokyo (JP); Yoichi Saito, Chiyoda-ku Tokyo (JP)

(73) Assignee: KONICA MINOLTA, INC., Chiyoda-Ku Tokyo (JP)

( * ) Notice: Subject to any disclaimer, the term of this patent is extended or adjusted under 35 U.S.C. 154(b) by 147 days.

(21) Appl. No.: 16/090,373

(22) PCT Filed: Mar. 15, 2017

(86) PCT No.: PCT/JP2017/010526
§ 371 (c)(1),
(2) Date: Oct. 1, 2018

(87) PCT Pub. No.: WO2017/169810
PCT Pub. Date: Oct. 5, 2017

(65) Prior Publication Data
US 2019/0111659 A1  Apr. 18, 2019

(30) Foreign Application Priority Data
Mar. 31, 2016 (JP) ................................. 2016-071520

(51) Int. Cl.
*B32B 7/02* (2019.01)
*B32B 27/40* (2006.01)
*G02B 5/28* (2006.01)
*G02B 5/26* (2006.01)
*B32B 7/023* (2019.01)

(52) U.S. Cl.
CPC ................ *B32B 7/02* (2013.01); *B32B 7/023* (2019.01); *B32B 27/40* (2013.01); *G02B 5/26* (2013.01); *G02B 5/28* (2013.01); *G02B 5/282* (2013.01); *G02B 5/287* (2013.01)

(58) Field of Classification Search
CPC ..... B32B 7/00–7/14; G02B 5/26; G02B 5/28; G02B 5/208; G02B 5/281; G02B 5/282; G02B 5/287; C09D 175/00–175/16; C09D 129/00–129/08
See application file for complete search history.

(56) References Cited

U.S. PATENT DOCUMENTS

| | | | | |
|---|---|---|---|---|
| 2007/0275218 A1* | 11/2007 | Kobayashi | ................. | C08J 7/04 428/212 |
| 2008/0103245 A1* | 5/2008 | Endo | .................... | B41M 5/5218 524/543 |
| 2008/0180801 A1* | 7/2008 | Kobayashi | .............. | G02B 1/111 359/586 |
| 2014/0192413 A1* | 7/2014 | Kokeguchi | .............. | G02B 5/26 359/584 |
| 2015/0168620 A1* | 6/2015 | Hakuta | .................... | G02B 1/11 359/359 |
| 2019/0004224 A1* | 1/2019 | Kimura | .................... | G02B 5/28 |

FOREIGN PATENT DOCUMENTS

JP  2012000973 A  1/2012

OTHER PUBLICATIONS

International Search Report corresponding to Application No. PCT/JP2017/010526; dated Jun. 27, 2017.
Written Opinion of the International Searching Authority corresponding to PCT/JP2017/010526; dated Jun. 27, 2017.

\* cited by examiner

*Primary Examiner* — Prashant J Khatri
(74) *Attorney, Agent, or Firm* — Cantor Colburn LLP

(57) ABSTRACT

An optical reflective film including refractive index layers containing a water-soluble resin is provided, wherein the film has a small color tone variation and less occurrence of cracks even after a prolonged use. An optical reflective film, including: a substrate; and a dielectric multilayer film formed by alternately laminating a low refractive index layer and a high refractive index layer, disposed on one surface of the substrate, wherein at least one layer of the low refractive index layer and the high refractive index layer is a water-dispersible cationic urethane resin-containing layer, containing: a water-soluble resin; a refractive index adjusting agent; a water-dispersible cationic urethane resin; and a cationic polymer having a tertiary amino group or a cation (salt) thereof or a quaternary ammonium group.

8 Claims, No Drawings

OPTICAL REFLECTIVE FILM

CROSS REFERENCE TO RELATED APPLICATIONS

This is the U.S. national stage of International Application No. PCT/JP2017/010526, filed on Mar. 15, 2017. Priority under 35 U.S.C. § 119(a) and 35 U.S.C. § 365(b) is claimed from Japanese Application No. 2016-071520, filed on Mar. 31, 2016, the disclosures all of which are also incorporated herein by reference.

TECHNICAL FIELD

The present invention relates to an optical reflective film.

BACKGROUND ART

In general, a dielectric multilayer film obtained by laminating a high refractive index layer and a low refractive index layer on a surface of a substrate, with an optical film thickness of each of the high refractive index layer and the low refractive index layer being adjusted, is known to selectively reflect light having a specific wavelength. This dielectric multilayer film is used as, for example, an optical reflective film installed in windows of a building, members for a vehicle, or the like. This optical reflective film transmits visible light and selectively shields near infrared rays, and since a reflective wavelength can be controlled only by adjusting a film thickness or a refractive index of each layer, it is possible to reflect ultraviolet rays and visible light.

As a method for forming a laminate such as a dielectric multilayer film, generally a method of lamination by a dry film forming method may be mentioned, but, since formation of a dielectric multilayer film by a dry film forming method requires a lot of manufacturing costs, it is not practical. As a practical method, for example, a method of applying a coating solution including a water-soluble resin and inorganic fine particles by a wet coating method to perform lamination may be mentioned. In particular, a manufacturing method of simultaneously applying a coating solution for a high refractive index layer and a coating solution for a low refractive index layer in a multilayered manner is excellent in terms of costs.

However, it is known that in a laminate obtained by forming a plurality of layers by applying a coating solution including a water-soluble resin and laminating them, adsorption and desorption of moisture easily occur. Each layer repeats contraction and expansion by adsorption and desorption of moisture, thereby producing cracks over time.

In order to improve water resistance of a laminate including a water-soluble resin, for example, JP 2012-973 A discloses a method in which a coating solution contains a crosslinking agent, and the water-soluble resin and the crosslinking agent are crosslinked at the interface between adjacent layers, so that the layers adhere to each other, thereby suppressing incorporation of moisture.

SUMMARY OF INVENTION

Technical Problem

As described in JP 2012-973 A, a water-soluble resin can be used in combination with a crosslinking agent, thereby improving water resistance of a laminate. However, in the method described in JP 2012-973 A, an unreacted crosslinking agent remains after application and drying of a coating solution, and thus, this crosslinking agent causes a reaction over time, thereby producing contraction due to post curing of a coated film. As a result, it was found that crack occurrence became worse when exposed to a high humidity environment for a long period of time.

In addition, since the optical reflective film is used as a heat shield film or a laminated glass, it may be exposed to strong sunlight for a long time in some cases. Therefore, the optical reflective film is required to have a small color tone variation even in the case of being exposed to sunlight for a long period of time.

Therefore, the present invention has been made in view of the above circumstances, and an object of the present invention is to provide an optical reflective film including a refractive index layer containing a water-soluble resin, wherein the optical reflective film has a small color tone variation or less occurrence of cracks even after a prolonged use.

Solution to Problem

The present inventors conducted an intensive study in order to solve the above problems, and as a result, have found that the object of the present invention is achieved by adopting the following configuration.

That is, the above object of the present invention is solved by the following means.

1. An optical reflective film, including:
   a substrate; and
   a dielectric multilayer film formed by alternately laminating a low refractive index layer and a high refractive index layer, disposed on one surface of the substrate,
   wherein at least one layer of the low refractive index layer and the high refractive index layer is a water-dispersible cationic urethane resin-containing layer, containing: a water-soluble resin; a refractive index adjusting agent; a water-dispersible cationic urethane resin; and a cationic polymer having a tertiary amino group or a cation (salt) thereof or a quaternary ammonium group.

2. The optical reflective film according to 1, wherein the cationic polymer having a tertiary amino group or a cation (salt) thereof or a quaternary ammonium group has a mass ratio of 0.2 to 4.0 by a solid content ratio, relative to the water-dispersible cationic urethane resin.

3. The optical reflective film according to 1 or 2, wherein the water-dispersible cationic urethane resin has a content of 2 to 20% by mass in the water-dispersible cationic urethane resin-containing layer.

4. The optical reflective film according to any one of 1 to 3, wherein the water-dispersible cationic urethane resin is a carbonate-based urethane resin.

5. The optical reflective film according to any one of 1 to 4, wherein the water-soluble resin has an average polymerization degree of 4000 to 6000.

6. The optical reflective film according to any one of 1 to 5, wherein at least one layer of the high refractive index layers is the water-dispersible cationic urethane resin-containing layer containing zirconium oxide particles as the refractive index adjusting agent.

7. The optical reflective film according to any one of 1 to 6, wherein at least one layer of the low refractive index layers is the water-dispersible cationic urethane resin-containing layer containing silicon oxide particles as the refractive index adjusting agent.

8. The optical reflective film according to any one of 1 to 7, wherein a plurality of the low refractive index layers is the water-dispersible cationic urethane resin-containing layer.

DESCRIPTION OF EMBODIMENTS

Hereinafter, the embodiments of the present invention are described.

One embodiment of the present invention is an optical reflective film including: a substrate; and a dielectric multilayer film formed by alternately laminating a low refractive index layer and a high refractive index layer, disposed on one surface of the substrate, wherein at least one layer of the low refractive index layer and the high refractive index layer is a water-dispersible cationic urethane resin-containing layer, containing a water-soluble resin; a refractive index adjusting agent; a water-dispersible cationic urethane resin; and a cationic polymer having a tertiary amino group or a cation (salt) thereof or a quaternary ammonium group.

According to the present invention, an optical reflective film having a refractive index layer containing a water-soluble resin can be obtained, wherein the film has a small color tone variation and less occurrence of cracks even after a prolonged use.

The optical reflective film of the present invention contains a water-soluble resin in at least one refractive index layer of a high refractive index layer and a low refractive index layer. Here, as described above, an optical reflective film containing a water-soluble resin has a problem in that cracks occur over time.

Accordingly, the present inventors studied on the cracks of an optical reflective film, and as a result, have found that expansion and contraction of a refractive index layer can be reduced, and occurrence of cracks over time can be reduced, by using a hydrophobic, water-dispersible cationic urethane resin, together with a water-soluble resin. In the case of adding a hydrophobic, water-dispersible cationic urethane resin to a water-soluble resin, when this resin is fused to form a film, a film having strong hydrophobicity can be obtained, as compared with the case that the water-dispersible cationic urethane resin is not added. Therefore, since expansion and contraction of a film due to a change in a moisture content in the atmosphere can be reduced, it is considered that occurrence of cracks can be prevented. In addition, a coated film becomes flexible by containing the water-dispersible cationic urethane resin, thereby reducing the force applied to the coated film at the time of expansion and contraction of the film due to a change in a moisture content in the atmosphere. In addition, it is known that a resin having a urethane bond has a higher elongation at break at the same Tg value, as compared with other resin, and it is considered that this characteristic advantageously functions for crack resistance.

In addition, since a urethane resin is generally colored by photodegradation of a urethane bond, it is more easily colored than an acrylic resin and the like. However, it was recognized that the coloring of a coated film can be also prevented by using a water-dispersible cationic urethane resin, and a cationic polymer having a tertiary amino group or a cation (salt) thereof or a quaternary ammonium group in combination. This is considered as being due to the fact that the water-dispersible cationic urethane resin and the tertiary amino group or the cation (salt) thereof or the quaternary ammonium group as a cationic group have an electron withdrawing property, thereby doing some action on a peroxide radical produced by light or heat, so that an oxidation reaction is stopped or delayed. The mechanism is based on assumption, and the present invention is not limited thereby.

Hereinafter, the constitutional elements of the optical reflective film of the present invention are described in detail. In the following, when a low refractive index layer and a high refractive index layer are not distinguished, they are referred to as a "refractive index layer", as a concept including both of them.

In addition, in the present specification, "X to Y" representing a range refers to "X or more and Y or less". In addition, unless otherwise particularly stated, measurement of operation and physical properties is performed under the conditions of room temperature (20 to 25° C.)/relative humidity of 40 to 50% RH.

[Optical Reflective Film]

The optical reflective film according to the present invention includes a substrate; and a dielectric multilayer film formed by alternately laminating a low refractive index layer and a high refractive index layer, disposed on one surface of the substrate.

[Substrate]

The optical reflective film according to the present invention includes a substrate for supporting a dielectric multilayer film and the like. As the substrate, various resin films can be used, and a polyolefin film (polyethylene, polypropylene, and the like), a polyester film (polyethylene terephthalate (PET), polyethylene naphthalate and the like), polyvinyl chloride, cellulose triacetate, and the like, and preferably a polyester film can be used. The polyester film (hereinafter, referred to as polyester) is not particularly limited, but preferably polyester having a film forming property, including a dicarboxylic acid component and a diol component as a main constitutional component.

Examples of the dicarboxylic acid component as a main constitutional component may include terephthalic acid, isophthalic acid, phthalic acid, 2,6-naphthalenedicarboxylic acid, 2,7-naphthalenedicarboxylic acid, diphenylsulfone dicarboxylic acid, diphenylether dicarboxylic acid, diphenylethane dicarboxylic acid, cyclohexane dicarboxylic acid, diphenyl dicarboxylic acid, diphenylthioether dicarboxylic acid, diphenylketone dicarboxylic acid, phenylindane dicarboxylic acid and the like. In addition, examples of the diol component may include ethylene glycol, propylene glycol, tetramethylene glycol, cyclohexanedimethanol, 2,2-bis(4-hydroxyphenyl)propane, 2,2-bis(4-hydroxyethoxyphenyl) propane, bis(4-hydroxylphenyl)sulfone, bisphenolfluorene dihydroxyethyl ether, diethylene glycol, neopentyl glycol, hydroquinone, cyclohexanediol and the like. Among the polyesters having them as a main constitutional component, polyesters having terephthalic acid or 2,6-naphthalenedicarboxylic acid as the dicarboxylic acid component, and ethylene glycol or 1,4-cyclohexanedimethanol as the diol component, as the main constitutional component are preferred from the viewpoint of transparency, mechanical strength, dimensional stability and the like. Among them, a polyester having polyethylene terephthalate or polyethylene naphthalate as the main constitutional component, a copolymerized polyester including terephthalic acid, 2,6-naphthalenedicarboxylic acid and ethylene glycol, and a polyester having a mixture of two or more of these polyesters as the main constitutional component are preferred.

The substrate used in the present invention has a thickness of 10 to 300 μm, in particular 20 to 150 μm. In addition, the substrate may be formed by piling two sheets, and in this case, the type may be identical to or different from each other.

The substrate has a transmittance in the visible light region of, preferably 85% or more, in particular 90% or more, in which the transmittance is specified in JIS R3106-1998. It is preferred that the substrate has such transmittance or higher, since the laminated film produced from the substrate has a transmittance in the visible light region of 50% or more (upper limit: 100%), in which the transmittance is specified in JIS R3106-1998.

In addition, the substrate using the resin and the like may be an unstretched film, or a stretched film. A stretched film is preferred from the viewpoint of strength improvement and suppression of thermal expansion.

The substrate can be produced by a conventionally known common method. For example, a resin as a material is melted by an extruder, and extruded by a circular die or a T die and quenched, thereby producing a substantially amorphous and unoriented, unstretched substrate. In addition, the unstretched substrate is stretched in a flow (longitudinal axis) direction of the substrate, or in a perpendicular (horizontal axis) direction to flow of the substrate, by a known method such as uniaxial stretching, tenter-type sequential biaxial stretching, tenter-type simultaneous biaxial stretching and tubular-type simultaneous biaxial stretching, thereby producing a stretched substrate. In this case, the stretching magnification can be appropriately selected according to the resin as the raw material of the substrate. However, by 2 to 10 times in a longitudinal axis direction and a horizontal axis direction, respectively, is preferred.

Further, the substrate may contain for example, stabilizers, surfactants, infrared ray absorbents, ultraviolet ray absorbents, flame retardants, antistatic agents, antioxidants, heat stabilizers, lubricants, fillers, coloring agents, dyes, adhesion regulators, and the like, as an additive.

[Dielectric Multilayer Film]

A dielectric multilayer film has a configuration of being formed by alternately laminating a low refractive index layer and a high refractive index layer, and has at least one unit composed of a low refractive index layer and a high refractive index layer. When the dielectric multilayer film has the configuration of including refractive index layers having different refractive indexes as such, in the case that light having a predetermined wavelength (for example, infrared light) is incident, the film can have a shielding effect (furthermore, a thermal shielding effect in the case of infrared light) by at least partially reflecting this light.

In the present embodiment, it is determined whether the refractive index layer forming the dielectric multilayer film is a low refractive index layer or high refractive index layer, by comparing the refractive index of the layer with that of the adjacent refractive index layer. Specifically, when a specific refractive index layer is a reference layer, and a refractive index layer adjacent to the reference layer has a lower refractive index than the reference layer, it is determined that the reference layer is a high refractive index layer (the adjacent layer is low refractive index layer). Meanwhile, when the adjacent layer has a higher refractive index than the reference layer, it is determined that the reference layer is a low refractive index layer (the adjacent layer is a high refractive index layer). Therefore, it is a relative matter determined by the relationship of the refractive indexes of the reference layer and the adjacent layer, whether the refractive index layer is a high refractive index layer or a low refractive index layer, and some refractive index layers can be a high refractive index layer and also a low refractive index layer, depending on the relationship with the adjacent layers.

The refractive index layer is not particularly limited as long as at least one refractive index layer of the high refractive index layer and the low refractive index layer forming the dielectric multilayer film is a water-dispersible cationic urethane resin-containing layer containing a water-soluble resin; a refractive index adjusting agent; a water-dispersible cationic urethane resin; and a cationic polymer having a tertiary amino group or a cation (salt) thereof or a quaternary ammonium group, and a known refractive index layer used in the art can be used. As the known refractive index layer, for example, a refractive index layer formed using a wet film forming method can be preferably used, from the viewpoint of manufacturing efficiency.

In addition, from the viewpoint of a reflection property, it is preferred that at least one of the high refractive index layer and the low refractive index layer contains a refractive index adjusting agent, and it is more preferred that both of the high refractive index layer and the low refractive index layer contain the refractive index adjusting agent.

In addition, as described above, the dielectric multilayer film of the optical reflective film of the present invention uses a water-soluble resin in at least one layer of the high refractive index layer and the low refractive index layer. In addition, it is preferred that the refractive index layer of the optical reflective film formed by a wet film forming method is a coated film formed by applying a coating solution (usually containing a water-based solvent such as water) containing a water-soluble resin. The water-soluble resin is preferred, since it does not use an organic solvent to have a low environmental load, and has high flexibility, so that the durability of the film upon bending is improved. The water-soluble resin is preferably used, particularly when at least one layer of the high refractive index layer and the low refractive index layer contains a refractive index adjusting agent.

In addition, in the present specification, the term "water-soluble" means that when a material is dissolved in water so as to have a concentration of 0.5% by mass, at a temperature where the material is most soluble, and filtered by a G2 glass filter (maximum pore size: 40 to 50 μm), the mass of the insoluble matter to be filtered out is within 50% by mass of the added polymer.

As described above, it is a relative matter determined by a relationship between the refractive index layer and the adjacent layer, whether the layer is a low refractive index layer or a high refractive index layer, and some refractive index layers can be a low refractive index layer and also a high refractive index layer. Hereinafter, among the refractive index layers which can be formed by each method, the configurations of representative high refractive index layer and low refractive index layers are described.

(High Refractive Index Layer)

The high refractive index layer contains preferably a water-soluble resin. If required, it may contain metal oxide particles as a refractive index adjusting agent, curing agents, surfactants, or other additives. The water-soluble resin and the refractive index adjusting agent contained in the high refractive index layer are hereinafter referred to as "a first water-soluble resin" and "a first refractive index adjusting agent", respectively, for convenience.

Here, it is preferred that the first refractive index adjusting agent contained in the high refractive index layer has a higher refractive index than that of the second refractive index adjusting agent contained in the low refractive index layer, as described below. It is preferred to contain the refractive index adjusting agent in the high refractive index layer and/or the low refractive index layer, since the refractive index difference between each refractive index layer can be large, and the number of lamination can be reduced, thereby increasing the transparency of the film. In addition, there is an advantage in that stress relaxation functions to improve film physical properties (flexibility upon bending and at high temperature and high humidity). The refractive index adjusting agent can be contained in any one refractive index layer, but it is preferred that at least the high refractive index layer contains the refractive index adjusting agent, and it is more preferred that both of the high refractive index layer and the low refractive index layer contain the refractive index adjusting agent.

(1) First Water-Soluble Resin

The first water-soluble resin is not particularly limited, but a polyvinyl alcohol-based resin, gelatin, celluloses, thickening polysaccharides and polymers having a reactive functional group can be used. Among them, it is preferred to use a polyvinyl alcohol-based resin Polyvinyl Alcohol-Based Resin Examples of the polyvinyl alcohol-based resin may include a usual polyvinyl alcohol (unmodified polyvinyl alcohol) which can be obtained by hydrolyzing polyvinyl acetate, and modified polyvinyl alcohol such as anion-modified polyvinyl alcohol, nonion-modified polyvinyl alcohol and vinyl alcohol-based polymer. By the modified polyvinyl alcohol, adhesion, water resistance and flexibility of a film may be improved.

Gelatin

As the gelatin, various types of gelatin which have been widely used in the field of silver halide photographic photosensitive materials can be applied. For example, acid-treated gelatin, alkali-treated gelatin, enzyme-treated gelatin which has been subjected to enzyme treatment in the course of manufacturing gelatin, a gelatin derivative which has a hydroxyl group or carboxyl group as a functional group in the molecule, and is modified by being treated with a reagent having a group capable of being reacted with the functional group, and the like may be listed.

When the gelatin is used, a hardener of the gelatin can be added, if necessary.

Celluloses

As the celluloses, water-soluble cellulose derivatives can be preferably used. For example, water-soluble cellulose derivatives such as carboxymethyl cellulose (cellulose carboxymethyl ether), methyl cellulose, hydroxy methyl cellulose, hydroxy ethyl cellulose and hydroxy propyl cellulose; carboxylic acid group-containing celluloses such as carboxymethyl cellulose (cellulose carboxymethyl ether) and carboxyethyl cellulose; cellulose derivatives such as nitrocellulose, cellulose acetate propionate, cellulose acetate and cellulose sulfate ester may be listed.

Thickening Polysaccharides

Thickening polysaccharides are polymers of saccharide, and has a plurality of hydrogen bonding groups in the molecule. The thickening polysaccharides has a characteristic of having a large difference between viscosity at low temperature and viscosity at high temperature, depending on a difference in hydrogen bonding force between molecules by temperature. In addition, when adding metal oxide fine particles to the thickening polysaccharides, a viscosity rise which is considered as being due to hydrogen bonding with the metal oxide fine particles at low temperature occurs. The viscosity rise width is usually 1.0 mPa·s or more, preferably 5.0 mPa·s or more, and more preferably 10.0 mPa·s or more, based on viscosity at 15° C.

The thickening polysaccharides to be used are not particularly limited, and the example thereof may include commonly known natural simple polysaccharides, natural complex polysaccharides, synthetic simple polysaccharides and synthetic complex polysaccharides. For details of these polysaccharides, reference can be made to "Dictionary of Biochemistry, 2nd edition, Tokyo Kagaku Dojin Publication", "Food Industry, Volume 31 (1988), p. 21", and the like.

Polymer Having a Reactive Functional Group

Examples of the polymer having a reactive functional group may include polyvinylpyrrolidones, acrylic resin such as polyacrylic acids, an acrylic acid-acrylonitrile copolymer, a potassium acrylate-acrylonitrile copolymer, vinyl acetate-acrylic acid ester copolymer and acrylic acid-acrylic acid ester copolymer; styrene acrylic acid resin such as styrene-acrylic acid copolymer, styrene-methacrylic acid copolymer, styrene-methacrylic acid-acrylic acid ester copolymer, styrene-α-methyl styrene-acrylic acid copolymer and styrene-α-methyl styrene-acrylic acid-acrylic acid ester copolymer; styrene-styrene sodium sulfonate copolymer, styrene-2-hydroxyethyl acrylate copolymer, styrene-2-hydroxyethyl acrylate-styrene potassium sulfonate copolymer, styrene maleic acid copolymer, styrene-anhydrous maleic acid copolymer, vinyl naphthalene-acrylic acid copolymer, vinyl naphthalene maleic acid copolymer, a vinyl acetate-based copolymer such as vinyl acetate maleic acid ester copolymer, vinyl acetate-crotonic acid copolymer and vinyl acetate-acrylic acid copolymer; and the salts thereof. Among them, it is preferred to use polyvinylpyrrolidones and a copolymer containing them.

The water-soluble resin described above may be used alone or in combination two or more.

The first water-soluble resin has a weight average molecular weight of preferably 1,000 to 200,000, more preferably 3,000 to 40,000. In the present specification, the value of "weight average molecular weight" is measured by gel permeation chromatography (GPC).

The content of the first water-soluble resin is preferably 5 to 50% by mass, and more preferably 10 to 40% by mass, based on 100% by mass of the solid content of the high refractive index layer.

(2) First Refractive Index Adjusting Agent

The first refractive index adjusting agent is not particularly limited, but preferably metal oxide particles having a refractive index of 2.0 to 3.0. Specifically, titanium oxide, zirconium oxide, cerium oxide, zinc oxide, alumina, colloidal alumina, lead titanate, red lead, chrome yellow, zinc yellow, chromium oxide, ferric oxide, iron black, copper oxide, magnesium oxide, magnesium hydroxide, strontium titanate, yttrium oxide, niobium oxide, europium oxide, lanthanum oxide, zircon, tin oxide and the like may be listed. The first refractive index adjusting agent described above may be used alone or in combination of two or more. Among them, the first refractive index adjusting agent is preferably titanium oxide, zirconium oxide or cerium oxide, from the viewpoint of forming a high refractive index layer which is transparent and has a high refractive index, and more preferably zirconium oxide, from the viewpoint of improving weatherability.

(Zirconium Oxide Particles Used in High Refractive Index Layer)

In the optical reflective film of the present invention, it is preferred that the high refractive index layer contains zirconium oxide particles as a refractive index adjusting agent. The high refractive index layer containing zirconium oxide particles is transparent and can exhibit a high refractive index. In addition, because of its low photocatalytic activity, the high refractive index layer or the low refractive index layer adjacent thereto has higher light fastness and weatherability. In the present invention, zirconium oxide refers to zirconium dioxide ($ZrO_2$).

The zirconium oxide particles may be cubic or tetragonal, and also may be a mixture thereof.

In addition, as the zirconium oxide particles, the particles which are dispersible in an organic solvent and the like by modifying the surface of aqueous zirconium oxide sol, may be used.

As a method for preparing the zirconium oxide particles or the dispersion thereof, any conventionally known method can be used. For example, as described in JP 2014-80361 A, a method in which a zirconium salt is reacted with alkali in water to prepare slurry of zirconium oxide particles, and an organic acid is added to perform hydrothermal treatment can be used.

As the zirconium oxide particles, commercially available ones can be used, for example, SZR—W, SZR-CW, SZR-M, SZR—K and the like (manufactured by Sakai Chemical Industry Co., Ltd.) are preferably used.

In addition, for the total amount of the refractive index adjusting agent used in the high refractive index layer (the total amount of zirconium oxide particles and the refractive index adjusting agent other than the zirconium oxide particles in the high refractive index layer), the content amount of the zirconium oxide particles is preferably 80 to 100% by mass, more preferably 90 to 100% by mass, and still more preferably 100% by mass.

(Titanium Oxide Particles Used in High Refractive Index Layer)

The titanium oxide particles used in the high refractive index layer is more preferably rutile type (tetragonal) titanium oxide particles, from the viewpoint of weatherability improvement.

In addition, the titanium oxide particle may be in the form of core-shell particle coated with a silicon-containing hydrated oxide. The core-shell particle has a structure in which the surface of the titanium oxide particle serving as a core is coated with a shell formed of a silicon-containing hydrated oxide. The volume average particle size of the titanium oxide particles being a core part is preferably more than 1 nm and less than 30 nm, and more preferably equal to or more than 4 nm and less than 30 nm. By containing these core-shell particles, interlayer mixing between the high refractive index layer and the low refractive index layer can be suppressed by the interaction of a silicon-containing hydrated oxide in a shell layer and a water-soluble resin.

(Cerium Oxide Particles Used in High Refractive Index Layer)

As cerium oxide particles, synthetic products may be used, or commercially available products may be used. Examples of the commercially available products which may be preferably used in the present invention may include colloidal ceria, such as NYACOL (registered trademark) CEO2(AC), NYACOL (registered trademark) CEO2(AC)-30, NYACOL (registered trademark) CEO2(NO3), NYACOL (registered trademark) DP6255 and NYACOL (registered trademark) DP6255-NH4 (manufactured by Nyacol Nano Technologies), and the like. Or, Needral (registered trademark) P10 (manufactured by TAM CHEMICAL CO., LTD.), NANOBYK (registered trademark)-3810 (manufactured by BYK), and the like may be used.

The size of the refractive index adjusting agent contained in the high refractive index layer is not particularly limited, but can be calculated by a volume average particle size or a primary average particle size. The volume average particle size of the refractive index adjusting agent used in the high refractive index layer is preferably 100 nm or less, more preferably 1 to 100 nm, and still more preferably 2 to 50 nm. In addition, the primary average particle size of the refractive index adjusting agent used in the high refractive index layer is preferably 100 nm or less, more preferably 1 to 100 nm, still more preferably 2 to 50 nm. It is preferred that the volume average particle size or the primary average particle size is 1 nm to 100 nm, from the viewpoint of having small haze and excellent visible light transmittance.

The volume average particle size in the present specification is obtained as follows: the particle size of 1,000 optional particles is measured by a method of observing the particles themselves using a laser diffraction scattering method, a dynamic light scattering method or an electron microscope, or by a method of observing a particle image represented on the cross section or surface of the refractive index layer with an electron microscope, and when in a group in which n1, n2, . . . , ni, . . . , nk particles having a particle size of d1, d2, . . . , di, . . . , dk, respectively, a volume per one particle is vi, a volume weighted average particle size represented by volume average particle size, $mv=\{\Sigma(vi \cdot di)\}/\{\Sigma(vi)\}$ is calculated.

In addition, the primary average particle size in the present specification can be measured from an electron microscopic photography by a transmission electron microscope (TEM) and the like. It may be measured by a particle size distribution meter or the like utilizing a dynamic light scattering method, a static light scattering method or the like.

In the case that it is obtained from a transmission electron microscope, the primary average particle size of the particles is obtained by observing the particles themselves or the particles shown on the cross section or surface of the refractive index layer with an electron microscope, and measuring the particle size of 1,000 optional particles to determine the primary average particle size as a simple average value (number average). Here, the particle size of each particle is a diameter of a circle which is assumed to have an area equal to its projected area.

In addition, it is preferred that the refractive index adjusting agent used in the present invention has monodispersity. The monodispersity referred herein means that monodispersity calculated by the following equation is 40% or less. This monodispersity is more preferably 30% or less, and particularly preferably 0.1 to 20%.

$$\text{Monodispersity}(\%) = \frac{\text{Standard deviation obtained from volume particle size distribution}}{\text{Volume average particle size}} \times 100 \qquad \text{[Equation 1]}$$

The content of the refractive index adjusting agent in the high refractive index layer is not particularly limited, but it is preferably 15 to 95% by mass, more preferably 20 to 90% by mass, and still more preferably 30 to 90% by mass, based on the total solid content of the high refractive index layer. Within this range, the optical reflection characteristics can be excellent.

(3) Curing Agent

A curing agent has a function of reacting with a first water-soluble resin (preferably, polyvinyl alcohol-based resin) contained in the high refractive index layer to form a network of a hydrogen bond.

The curing agent is not particularly limited, as long as it causes a curing reaction with the first water-soluble resin. However, in general, the example thereof may include a compound having a group capable of reacting with the water-soluble resin or a compound promoting a reaction between different groups possessed by the water-soluble resin.

As a specific example, in the case that polyvinyl alcohol is used as the first water-soluble resin, it is preferred that boric acid and the salt thereof are used as the curing agent. In addition, known curing agents other than boric acid and the salt thereof can be used.

Boric acid and the salt thereof refer to an oxygen acid having a boron atom as a central atom and the salt thereof. Specifically, orthoboric acid, diboric acid, metaboric acid, tetraboric acid, pentaboric acid, octaboric acid, and the salts thereof may be listed.

The content of the curing agent is preferably 1 to 10% by mass, and more preferably 2 to 6% by mass, based on the solid content of 100% by mass of the high refractive index layer (or low refractive index layer).

In particular, when polyvinyl alcohol is used as the first water-soluble resin, the total amount of the curing agent to be used is preferably 1 to 600 mg, and more preferably 10 to 600 mg, per 1 g of polyvinyl alcohol.

Surfactant

As a surfactant used for adjusting surface tension at the time of coating, a cationic surfactant, an anionic surfactant, a nonionic surfactant, an amphoteric surfactant, or the like may be used, and the amphoteric surfactant is more preferred.

Examples of the amphoteric surfactant preferably used in the present invention may include an amidosulfobetaine type, a carboxybetaine type, a sulfobetaine type, an imidazolium type, or the like. The specific example of the amphoteric surfactant preferably used in the present invention is described below. In the present invention, a sulfobetaine type and a carboxybetaine type are preferred from the viewpoint of coating unevenness, and as a product, LSB-R, LSB, LMEB-R (manufactured by Kawaken Fine Chemicals Co., Ltd.), AMPHITOL (registered trademark) 20 HD (manufactured by Kao Corporation), or the like may be listed.

Examples of the cationic surfactant may include an alkyl amine salt and a quaternary ammonium salt.

The anionic surfactant is a surfactant in which a hydrophilic group ionizes into an anion in an aqueous solution, and as the anionic surfactant, a sulfuric acid ester salt, a sulfonic acid salt, a carboxylic acid salt, a phosphoric acid ester salt, or the like may be listed. For example, an alkyl sulfuric acid ester salt, a polyoxyethylene alkylethersulfuric acid ester salt, a polyoxyethylene arylethersulfuric acid ester salt, an alkylbenzene sulfonic acid salt, an aliphatic acid salt, a polyoxyethylene alkylether phosphoric acid salt, or a dipotassium alkenylsuccinate may be used. Examples of the commercially available anionic surfactants may include Emal (registered trademark) manufactured by Kao Corporation, HITENOL (registered trademark) NF-08, NF-0825, NF-13 and NF-17, manufactured by DKS Co. Ltd. (all polyoxyethylene styrenated phenylether ammonium sulfate), and the like, as a sulfuric acid ester salt, and Neopelex (registered trademark) and Pelex (registered trademark), manufactured by Kao Corporation, as a sulfonic acid salt. As a carboxylic acid salt, Neohitenol (registered trademark) manufactured by DKS Co., Ltd., may be listed, and as a phosphoric acid salt, PLYSURF (registered trademark) manufactured by DKS Co., Ltd., and the like may be listed.

As a nonionic surfactant, polyoxyethylene alkyl ether (for example, EMULGEN (registered trademark) manufactured by Kao Corporation), polyoxyethylene sorbitan aliphatic acid ester (for example, Leodol (registered trademark) TW series, manufactured by Kao Corporation), glycerin aliphatic acid ester, polyoxyethylene aliphatic acid ester, polyoxyethylene alkyl amine and alkyl alkanol amide may be listed. Or, as polyoxyethylene alkyl ether, polyoxyethylene mono 2-ethylhexyl ether, and polyoxyethylene decyl ether (for example, Noigen (registered trademark) XL-40, XL-50, XL-60 and the like, manufactured by DKS Co., Ltd.) may be listed.

The content of the surfactant in the high refractive index layer is preferably 0.001 to 1% by mass, more preferably 0.005 to 0.50% by mass, based on the total solid content of the high refractive index layer.

The high refractive index layer may contain other additives. Examples of the other additive may include an amino acid, a lithium compound, and the like. In addition, various known additives, for example, a UV absorber described in JP S57-74193 A, JP S57-87988 A, JP S62-261476 A; an antifading agent described in JP S57-74192 A, JP S57-87989 A, JP S60-72785 A, JP S61-146591 A, JP H01-95091 A, JP H03-13376 A and the like; a fluorescent whitening agent described in JP S59-42993 A, JP S59-52689 A, JP S62-280069 A, JP S61-242871 A, JP H04-219266 A and the like; a pH adjusting agent such as sulfuric acid, phosphoric acid, acetic acid, citric acid, sodium hydroxide, potassium hydroxide and potassium carbonate; a defoaming agent; a lubricant such as diethylene glycol; a preservative; an antifungal agent; an antistatic agent; a matting agent; a thermal stabilizer; an antioxidant; a flame retardant; a crystal nucleating agent; inorganic particles; organic particles; a thinning agent; a lubricant; an infrared absorber; a dye; a pigment and the like, may be used as other additive.

(Low Refractive Index Layer)

A low refractive index layer also preferably contains the water-soluble resin. If necessary, it may contain a refractive index adjusting agent, a curing agent, a surfactant, or other additives. In addition, the water-soluble resin and the refractive index adjusting agent contained in the low refractive index layer are referred to as "a second water-soluble resin" and "a second refractive index adjusting agent", respectively, for convenience.

(1) Second Water-Soluble Resin

As the second water-soluble resin, the same water-soluble resin as the first water-soluble resin can be used.

Here, in the case that both of the high refractive index layer and the low refractive index layer use a polyvinyl alcohol-based resin as the first water-soluble resin and the second water-soluble resin, it is preferred to use a polyvinyl alcohol-based resin having a different saponification degree, respectively. Thus, mixing at the interface is suppressed, and an infrared reflectance (infrared shielding ratio) becomes better, thereby lowering haze. In the present specification, a saponification degree is a ratio of a hydroxyl group relative to the total number of a carbonyloxy group such as an acetyloxy group (derived from vinyl acetate as a raw material) and a hydroxyl group in a polyvinyl alcohol resin. In addition, the saponification degree of polyvinyl alcohol can be measured according to the method described in Japanese Industrial Standards JIS K 6726: 1994.

The content of the second water-soluble resin is preferably 3 to 60% by mass, and more preferably 10 to 45% by mass, based on 100% by mass of the solid content of the low refractive index layer.

(2) Second Refractive Index Adjusting Agent

The second refractive index adjusting agent is not particularly limited, but it is preferred to use silica (silicon dioxide) such as synthetic amorphous silica and colloidal silica, or polysilsesquioxane. The refractive index adjusting agent contained in the low refractive index layer for adjusting the refractive index may be used alone, or in combination of two or more.

(Silicon Oxide Particles Used in Low Refractive Index Layer)

The specific examples of the silicon oxide particles may include synthetic amorphous silica, colloidal silica, zinc oxide, alumina, colloidal alumina and the like. Among them, it is more preferred to use colloidal silica sol, in particular acidic colloidal silica sol, and it is particularly preferred to use colloidal silica dispersed in an organic solvent. In addition, in order to further reduce the refractive index, hollow fine particles having pores inside the particles may be used as the refractive index adjusting agent of the low refractive index layer.

The colloidal silica used in the present invention can be obtained by heating and aging silica sol obtained by double-decomposing sodium silicate with an acid and the like or that obtained by passing through an ion exchange resin layer, and for example, is described in JP S57-14091 A, JP S60-219083 A, JP S60-219084 A, JP S61-20792 A, JP S61-188183 A, JP S63-17807 A, JP H04-93284 A, JP H05-278324 A, JP H06-92011 A, JP H06-183134 A, JP H06-297830 A, JP H07-81214 A, JP H07-101142 A, JP H07-179029 A, JP H07-137431 A, and International Publication No. 94/26530 A, and the like.

As this colloidal silica, a synthetic product may be used, or a commercially available product may be used. Examples of the commercially available product may include SNOWTEX (registered trademark) series (SNOWTEX (registered trademark) OS, OXS, S, OS, 20, 30, 40, O, N, C, etc.), available from Nissan Chemical Industries, Limited.

The colloidal silica may be colloidal silica of which the surface is cation-modified, or colloidal silica treated with Al, Ca, Mg, Ba or the like.

In addition, as silicon oxide particles of the low refractive index layer, hollow fine particles may be used, as described above. In the case of using hollow fine particles, they have an average particle pore size of preferably 3 to 70 nm, more preferably 5 to 50 nm, and still more preferably 5 to 45 nm. The average particle pore size of hollow fine particle is an average value of an inner diameter of hollow fine particles. When the average particle pore size of hollow fine particles is within the above range, the refractive index of the low refractive index layer is sufficiently lowered. The average particle pore size can be obtained by randomly observing 50 or more pore diameters which can be observed as a circle or an ellipse, or substantially a circle or an ellipse with electron microscope observation, calculating a pore diameter of each particle, and calculating the number average value thereof. The average particle pore size refers to a minimum distance, among the distances between two parallel lines in contact with an outer edge of the pore diameter which can be observed as a circle or an ellipse, or substantially a circle or an ellipse.

(Polysilsesquioxane Particles Used in Low Refractive Index Layer)

Polysilsesquioxane is a network type polymer or a polyhedron cluster having a siloxane bond in the main chain, and a hydrogen atom or an organic group in the side chain, which can be obtained by hydrolyzing a trifunctional silane compound, and any structure of a cage shape, a ladder shape and a random shape can be preferably used.

Examples of the polysilsesquioxane may include polyhydrogenated silsesquioxane, polymethylsilsesquioxane, polyethylsilsesquioxane, polypropylsilsesquioxane, polyisopropylsilsesquioxane, polybutylsilsesquioxane, poly-sec-butylsilsesquioxane, poly-tert-butylsilsesquioxane, polyvinylsilsesquioxane, polyphenylsilsesquioxane, polynaphthylsilsesquioxane, polystyrylsilsesquioxane, polyadamantylsilsesquioxane and the like. Among them, polymethylsilsesquioxane, and polyvinylsilsesquioxane are preferred.

As polysilsesquioxane particles, a synthetic product may be used, or a commercially available product may be used. As a commercially available product which can be preferably used in the present invention, SP series (e.g., SP-1120 (H2O), SP-1160 (H2O), SP-6120 (H2O)) manufactured by KONISHI CHEMICAL INC. CO., LTD., and the like may be listed.

The second refractive index adjusting agent (preferably silicon dioxide) contained in the low refractive index layer of the present invention has an average particle size (number average; diameter) of preferably 3 to 100 nm, and more preferably 3 to 50 nm. In the present specification, the "average particle size (number average; diameter)" of the refractive index adjusting agent is obtained by observing the particles themselves, or the particles shown on the cross section or surface of the refractive index layer with an electron microscope, and measuring the particle size of 1,000 optional particles to determine the simple average value (number average). Here, the particle size of each particle is a diameter of a circle which is assumed to have an area equal to its projected area.

The content of the second refractive index adjusting agent in the low refractive index layer is preferably 0.1 to 70% by mass, more preferably 30 to 70% by mass, still more preferably 45 to 65% by mass, based on 100% by mass of the total solid content of the low refractive index layer.

The second refractive index adjusting agent described above may be used alone, or in combination of two or more, from the viewpoint of adjusting the refractive index, and the like.

Cationic Polymer

In the optical reflective film according to the present invention, the low refractive index layer may contain a cationic polymer having a cation or a cationic group. The cationic polymer is not particularly limited, However, for example, a cationic polymer having a tertiary amino group or a cation (salt) thereof or a quaternary ammonium group contained in the water-dispersible cationic urethane resin-containing layer as described below may be preferably used. Other cationic polymer may be contained.

Curing Agent, Surfactant, Other Additives

As a curing agent, a surfactant, and other additives, those which are the same as those of the high refractive index layer may be used, and thus, the description therefor is omitted herein.

(Water-Dispersible Cationic Urethane Resin-Containing Layer)

In the optical reflective film of the present invention, as described above, at least one layer of the high refractive index layer and the low refractive index layer forming the dielectric multilayer film is a water-dispersible cationic urethane resin-containing layer containing a water-soluble resin; a refractive index adjusting agent; a water-dispersible cationic urethane resin; and a cationic polymer having a tertiary amino group or a cation (salt) thereof or a quaternary ammonium group.

The water-dispersible cationic urethane resin-containing layer may be the high refractive index layer or the low refractive index layer, as long as it contains a water-soluble resin; a refractive index adjusting agent; a water-dispersible cationic urethane resin; and a cationic polymer having a tertiary amino group or a cation (salt) thereof or a quaternary ammonium group. As the water-dispersible cationic urethane resin-containing layer, the same configuration as the high refractive index layer and the low refractive index layer can be adopted, except that it contains a water-soluble resin, a refractive index adjusting agent, a water-dispersible cationic urethane resin, and a cationic polymer having a tertiary amino group or a cation (salt) thereof or a quaternary ammonium group. In general, since the water-dispersible cationic urethane resin has a low refractive index (about 1.5), in the case that an unfused water-dispersible cationic urethane resin remains, there is a concern of haze increase, depending on the refractive index of the high refractive index layer, and thus, it is preferred that the water-dispersible cationic urethane resin-containing layer is the low refractive index layer.

In addition, in the optical reflective film of the present invention, at least one layer of the high refractive index layer and the low refractive index layer forming the dielectric multilayer film is a water-dispersible cationic urethane resin-containing layer, but preferably, a plurality of low refractive index layers is the water-dispersible cationic urethane resin-containing layer. When a plurality of low refractive index layers is the water-dispersible cationic urethane resin-containing layer, haze is suppressed, and at the same time, the effect of combining prevention of cracks and suppression of coloring can be remarkable.

In addition, preferably a lowest layer in contact with a substrate, or an uppermost layer on the opposite side of a substrate is the water-dispersible cationic urethane resin-containing layer. More preferably, all low refractive index layers including the lowest layer and the uppermost layer are the water-dispersible cationic urethane resin-containing layer.

Water-Dispersible Cationic Urethane Resin

The water-dispersible cationic urethane resin applied to the present invention is a resin having a cationic group in the molecule, and being formed of a water dispersion formed by a urethane resin being self-emulsified in an aqueous solvent. Since the water-dispersible cationic urethane resin is hydrophobic, a film having strong hydrophobicity can be obtained when fused and formed into a film. Therefore, expansion and contraction of a film by a change in a moisture content in the atmosphere can be reduced, thereby preventing occurrence of cracks. In addition, a coated film becomes flexible, thereby reducing force applied to the coated film at the time of expansion and contraction of a film by a change in a moisture content in the atmosphere. As the cationic group, for example, a quaternary ammonium group and the like may be listed.

The aqueous dispersion may be any one of a reaction type and a non-reaction type. The reaction type aqueous dispersion is formed by emulsifying a urethane resin having an isocyanate group (reactive group) blocked with a blocking agent in an aqueous solvent. The reaction type aqueous dispersion is also classified into a self-emulsification type and a forced emulsification type. The reaction type aqueous dispersion of the self-emulsification type is formed by self-emulsifying a urethane resin having an isocyanate group blocked with a hydrophilic blocking agent in an aqueous solvent. Meanwhile, the reaction type aqueous dispersion of the forced emulsification type is formed by forcibly emulsifying a urethane resin having an isocyanate group blocked with a hydrophobic blocking agent in an aqueous solvent, by a surfactant and the like.

Meanwhile, a non-reaction type aqueous dispersion is formed by emulsifying a urethane resin (unreactive urethane resin) which does not have an isocyanate group (reactive group) in an aqueous solvent.

The non-reaction type aqueous dispersion is also classified into a self-emulsification type and a forced emulsification type. The non-reaction type aqueous dispersion of the self-emulsification type is formed by self-emulsifying a hydrophilic unreactive urethane resin in an aqueous solvent. Meanwhile, the non-reaction type aqueous dispersion of the forced emulsification type is formed by forcibly emulsifying a hydrophobic unreactive urethane resin in an aqueous solvent, by a surfactant and the like.

Among them, it is preferred that the aqueous dispersion is the non-reaction type aqueous dispersion of the self-emulsification type.

The non-reaction type aqueous dispersion of the self-emulsification type is formed as follows. That is, a urethane prepolymer is synthesized from a polyol having no hydrophilic group, a polyol having a hydrophilic group and polyisocyanate, emulsified in an aqueous medium, and crosslinked with each other by chain extension of isocyanate, thereby forming the aqueous dispersion in which a urethane resin having an internal crosslinked structure is emulsified in an aqueous medium.

In addition, the urethane resin can be obtained by an addition polymerization reaction of polyisocyanate and polyol. However, the water-dispersible cationic urethane resin used in the present invention may be any one of an ether-based urethane resin using a polyether-based polyol as a polyol, an ester-based urethane resin using a polyester-based polyol and a carbonate-based urethane resin using a polycarbonate-based polyol. Among them, the carbonate-based urethane resin is preferred in excellent water resistance and hydrolysis resistance, since it has small contraction due to moisture adsorption and desorption, and a high effect of suppressing cracks.

As the water-dispersible cationic urethane resin, a commercially available product may be used, for example, SUPERFLEX (registered trademark) 620 and 650 (manufactured by DKS Co. Ltd.), and Hydran (registered trademark) CP-7020 and CP-7050 (manufactured by DIC corporation) may be listed.

The particle size of the water-dispersible cationic urethane resin is not particularly limited, but the average particle size is preferably 1 to 100 nm, more preferably 5 to 60 nm. When the water-dispersible cationic urethane resin has the average particle size as described above, the haze of the obtained optical reflective film is reduced to improve transparency. The average particle size of the water-dispersible cationic urethane resin can be measured by a dynamic light scattering method.

The refractive index of the water-dispersible cationic urethane resin is not particularly limited, but the refractive index is preferably 1.3 to 1.7, and more preferably 1.4 to 1.6. Within the range, it is close to the refractive index of the water-soluble resin, and thus, the haze of the obtained optical reflective film can be reduced.

The water-dispersible cationic urethane resin described above has a glass transition temperature (Tg) of preferably 75° C. or less, and more preferably −30 to 50° C., from the viewpoint of increasing flexibility.

In the optical reflective film of the present invention, the content (solid content mass) of the water-dispersible cationic urethane resin in the water-dispersible cationic urethane resin-containing layer is for example, 1 to 30% by mass, preferably 1 to 25% by mass, more preferably 2 to 20% by mass, based on the total mass (solid content mass) of the water-dispersible cationic urethane resin-containing layer. When the content of the water-dispersible cationic urethane resin is 1% by mass or more, the water-dispersible cationic urethane resins are easily fused with each other, thereby obtaining an excellent crack prevention effect. Meanwhile, when the content of the water-dispersible cationic urethane resin is 30% by mass or less, coloring can be suppressed. In addition, it is difficult to cause a decrease in viscosity of a coating solution at the time of aqueous coating, in particular simultaneous multilayer coating, thereby forming a uniform coated film, and thus, cracks hardly occur even after a prolonged use, and also coating film failure is unlikely to occur. In addition, since the mixing of refractive index layers due to decreased viscosity of a coating solution can be suppressed, haze is unlikely to occur. When two or more water-dispersible cationic urethane resins are used, it is preferred that the total amount is within the above range. When two or more water-dispersible cationic urethane resin-containing layers are included, it is preferred that the content of the water-dispersible cationic urethane resin of at least one layer is within the above range, and it is more preferred that the content of all layers are within the above range.

Cationic Polymer

The cationic polymer applied to the present invention is a polymer having a tertiary amino group or a cation (salt) thereof or a quaternary ammonium group, as a cation group. By using the cationic polymer having a tertiary amino group or a cation (salt) thereof or a quaternary ammonium group, the coloring of a coated film containing the water-dispersible cationic urethane resin can be prevented. It can be determined whether the cationic polymer is cationic by adding a cationic polymer to colloidal silica, and measuring a zeta potential. In the present specification, the cationic polymer having a tertiary amino group or a cation (salt) thereof or a quaternary ammonium group does not include the water-dispersible cationic urethane resin as described above.

In addition, when particles having an anionic surface such as silicon oxide particles are used as a refractive index adjusting agent, in particular a cationic polymer having a tertiary amino group or a cation (salt) thereof contributes to effectively cationize the surface of the refractive index adjusting agent, and maintain the dispersion stability of the refractive index adjusting agent in a coating solution, thereby improving coatability. Meanwhile, a cationic polymer having a quaternary ammonium group as a cationic group has an effect of causing microaggregation of the refractive index adjusting agent, thereby protecting the refractive index adjusting agent. Therefore, it is easier to cause microaggregation without precipitating silicon oxide particles, by further using the cationic polymer having a quaternary ammonium group, thereby increasing interaction with the water-soluble resin. Thus, mixing with the adjacent refractive index layer upon multilayer coating is suppressed, thereby obtaining the optical reflective film having less haze.

The cationic polymer having a tertiary amino group or a cation (salt) thereof or a quaternary ammonium group is not particularly limited. However, the example thereof may include polyallylamine amide sulfate, a copolymer of allylamine hydrochloride and diallylamine hydrochloride, a copolymer of allylamine hydrochloride and dimethylallylamine hydrochloride, a copolymer of allylamine hydrochloride and others, a partially methoxycarbonylated allylamine polymer, a partially methylcarbonylated allylamine acetate polymer, a diallylamine hydrochloride polymer, a methyldiallylamine hydrochloride polymer, a methyldiallylamine amide sulfate polymer, a methyldiallylamine acetate polymer, a copolymer of diallylamine hydrochloride and sulfur dioxide, a copolymer of diallylamine acetate and sulfur dioxide, a copolymer of diallylmethylethylammoniummethyl sulfate and sulfur dioxide, a copolymer of methyl diallylamine hydrochloride and sulfur dioxide, a copolymer of diallyl dimethyl ammonium chloride and sulfur dioxide, a copolymer of diallyl dimethyl ammonium chloride and acryl amide, a copolymer of diallyl dimethyl ammonium chloride and a diallylamine hydrochloride derivative, a copolymer of dimethyl amine and epichlorohydrin, a copolymer of dimethyl amine, ethylene diamine and epichlorohydrin, a copolymer of polyamide polyamine and epichlorohydrin, a vinylpyrrolidone-N,N-dimethylaminoethyl methacrylic acid copolymer, and the like.

In particular, a methyl diallylamine hydrochloride polymer, a methyl diallylamineamide sulfate polymer, a methyldiallylamine acetate polymer, and the like is preferably used as a cationic polymer having tertiary amino group or a cation (salt) thereof, and a diallyl dimethyl ammonium chloride polymer, a vinylpyrrolidone-N,N-dimethylaminoethyl methacrylic acid copolymer and the like are preferably used as a cationic polymer having a quaternary ammonium group.

As the cationic polymer, a commercially available product, for example, PAS-M-1, PAS-M-1 L, PAS-H-1 L, PAS-H-5 L, PAS-H-10 L (manufactured by NITTOBO MEDICAL CO., LTD.), H.C. Polymer 1S(M), H.C. Polymer 1N(M), H.C. Polymer 1NS (manufactured by OSAKA ORGANIC CHEMICAL INDUSTRY LTD), and the like may be used.

The cationic polymer may be used alone, or in combination of two or more.

The content of the cationic polymer having a tertiary amino group or a cation (salt) thereof or a quaternary ammonium group in the water-dispersible cationic urethane resin-containing layer is not particularly limited, as long as its effect is exerted, the mass ratio of the cationic polymer to the water-dispersible cationic urethane resin is preferably 0.1 to 5.0, more preferably 0.2 to 4.0, and still more preferably 0.2 to 2.0, by a solid content ratio (cationic polymer/water-dispersible cationic urethane resin). When the mass ratio of the cationic polymer to the water-dispersible cationic urethane resin in the water-dispersible cationic urethane resin-containing layer is 0.1 or more, the effect of suppressing coloring is excellent, and when the ratio is 5.0 or less, crack resistance is excellent. When two or more water-dispersible cationic urethane resin-containing layers are included, it is preferred that the mass ratio of at least one layer of the cationic polymer is within the range, and it is more preferred that the mass ratio of all of the water-dispersible cationic urethane resin-containing layers are within the range.

The weight average molecular weight of the cationic polymer is not particularly limited, but it is preferably 5,000 to 800,000, more preferably 5,000 to 200,000, and still more preferably 20,000 to 30,000. In the present specification, the value of a "weight average molecular weight" is adopted as a value measured by gel permeation chromatography (GPC).

Refractive Index Adjusting Agent

The water-dispersible cationic urethane resin-containing layer contains a refractive index adjusting agent. As the refractive index adjusting agent, the same refractive index adjusting agent as the those used in the high refractive index layer and the low refractive index layer can be used, the when the water-dispersible cationic urethane resin-containing layer is the high refractive index layer, it is preferred that the refractive index adjusting agent is zirconium oxide particles, from the viewpoint of a refractive index, transparency and stability to light. When the water-dispersible cationic urethane resin-containing layer is the low refractive index layer, it is preferred that the refractive index adjusting agent is silicon oxide particles. Since the silicon oxide particles have a large interaction with the water-soluble resin, the interlayer mixing with the adjacent refractive index layer is suppressed at the time of multilayer coating of a coating solution, thereby obtaining an optical reflective film having less haze.

Water-Soluble Resin

The water-dispersible cationic urethane resin-containing layer in the optical reflective film of the present invention contains a water-soluble resin. As the water-soluble resin, the same resin as the high refractive index layer and the low refractive index layer may be used.

Preferably, the water-soluble resin in the water-dispersible cationic urethane resin-containing layer has an average polymerization degree of 1,500 to 6,000, and more preferably 4,000 to 6,000. The water-soluble resin in the water-dispersible cationic urethane resin-containing layer has an average polymerization degree of still more preferably 4,000 to 5,000, and even more preferably 4,500 to 5,000. When the water-soluble resin has an average polymerization degree of 1,500 or more, even in the case of coating by a simultaneous multilayer coating method, the occurrence of haze caused by diffusion of the water-soluble resin can be suppressed. In addition, when the water-soluble resin has an average polymerization degree of 6,000 or less, the viscosity of a coating solution does not become unduly high, and thus, it is appropriate for manufacture of a dielectric multilayer film by coating.

In addition, it is preferred that the water-soluble resin in the water-dispersible cationic urethane resin-containing layer is polyvinyl alcohol. In this case, dispersity of the water-dispersible cationic urethane resin is stabilized, thereby suppressing an increase in haze. The polyvinyl alcohol has a saponification degree of, for example, 70 to 99.5 mol %, and from the viewpoint of further suppressing haze, preferably 80 to 95 mol %, and more preferably 85 to 90 mol %. The polymerization degree of the polyvinyl alcohol can be measured in accordance with Japanese Industrial Standards JIS K6726: 1994.

As described above, in the optical reflective film of the present invention, at least one layer of the high refractive index layer and the low refractive index layer forming the dielectric multilayer film is the water-dispersible cationic urethane resin-containing layer, but it is preferred that the lowest layer on the substrate side, or the uppermost layer which is the farthest layer from the substrate is the water-dispersible cationic urethane resin-containing layer.

In the case that the uppermost layer of the dielectric multilayer film is adhered to a base such as glass through for example, an adhesive layer so that the dielectric multilayer film is used as an optical reflector, in the uppermost layer of the dielectric multilayer film, when expansion and contraction of a layer due to adsorption and desorption of moisture in the environment occur, stress tends to be concentrated therefrom. Therefore, it is effective in improving the weatherability of the optical reflective film to dispose a water-dispersible cationic urethane resin-containing layer which can suppress adsorption and desorption of moisture in the environment on the uppermost layer.

In addition, in one preferred embodiment of the present invention, the lowest layer in contact with a substrate, among the refractive index layers forming the dielectric multilayer film is the water-dispersible cationic urethane resin-containing layer. In the lowest layer of the dielectric multilayer film, when expansion or contraction of the layer due to adsorption or desorption of moisture in the environment occurs, as compared with the inner layer, stress tends to be concentrated therefrom, and thus, it is preferred that the lowest layer is the water-dispersible cationic urethane resin-containing layer. More preferably, both the uppermost layer and the lowest layer are the water-dispersible cationic urethane resin-containing layer.

In a preferred embodiment of the present invention, the uppermost layer and the lowest layer of the dielectric multilayer film is the low refractive index layer, and all of the low refractive index layers are the water-dispersible cationic urethane resin-containing layer. By doing so, the dielectric multilayer film using the water-soluble resin can further reduce the adsorption and desorption of moisture depending on a change in the moisture content in the environment, thereby further reducing crack occurrence when exposed to high humidity for a long period of time. Here, when the water-soluble resin in the water-dispersible cationic urethane resin-containing layer has an average polymerization degree of 4,000 to 6,000, haze rise is unlikely to occur, even in the case that the water-dispersible cationic urethane resin is contained in all of the low refractive index layer.

The thickness of the water-dispersible cationic urethane resin-containing layer is not particularly limited. However, when the water-dispersible cationic urethane resin-containing layer is the high refractive index layer, the thickness per one layer is preferably 20 to 800 nm, more preferably 50 to 500 nm. In addition, when the water-dispersible cationic urethane resin-containing layer is the low refractive index layer, the thickness per one layer is preferably 20 to 800 nm, more preferably 50 to 500 nm.

[Optical Properties]

In the case that the optical reflective film of the present invention is an infrared shielding film reflecting infrared light, it is preferred to design a difference in the refractive index between the low refractive index layer and the high refractive index layer to be large, from the viewpoint of increasing an infrared reflectance with a small number of layers. In the present embodiment, in at least one of the lamination units composed of the low refractive index layer and the high refractive index layer, the difference in the refractive index between the adjacent low refractive index layer and the high refractive index layer is preferably 0.15 or more, more preferably 0.2 or more, still more preferably 0.21 or more. In addition, the upper limit is not particularly limited, but it is generally 0.5 or less. In the case that a plurality of laminates of the high refractive index layer and the low refractive index layer is provided, it is preferred that the difference in the refractive index between the high refractive index layer and the low refractive index layer in all laminates is within the above preferred range. However, in this case also, the refractive index layer forming the uppermost layer or the lowest layer of the dielectric multilayer film may have the configuration outside the above preferred range.

As the optical properties of the optical reflective film of the present embodiment, the transmittance in the visible light region indicated in JIS R3106-1998 is preferably 50% or more, more preferably 75% or more, and still more preferably 85% or more. In addition, it is preferred to have a region of a reflectance more than 50% in a wavelength range of 900 nm to 1400 nm.

The number of layers of the refractive index layer (total number of layers of the high refractive index layer and the low refractive index layer) of the dielectric multilayer film is, from the above viewpoint, for example, 6 to 500, and preferably 6 to 300. In addition, particularly in the case of manufacture by a wet film-forming method, 6 to 50 layers are preferred, 8 to 40 layers are more preferred, 9 to 30 layers are still more preferred, and 11 to 31 layers are particularly preferred. It is preferred that the number of the layers of the refractive index layer of the dielectric multilayer film is within the above range, since excellent thermal barrier performance and transparency, inhibition of peeling or cracking, and the like can be realized. In the case that the dielectric multilayer film has a plurality of high refractive index layers and/or the low refractive index layers, each high refractive index layer and/or each low refractive index layer may be identical to or different from each other.

The high refractive index layer has a thickness per one layer of preferably 20 to 800 nm, and more preferably 50 to 500 nm. In addition, the low refractive index layer has a thickness per one layer of preferably 20 to 800 nm, and more preferably 50 to 500 nm.

Here, when measuring the thickness per one layer, the composition may change continuously with no clear interface at the boundary between the high refractive index layer and the low refractive index layer. In the interface region in which this composition changes continuously, when the maximum refractive index−the minimum refractive index=$\Delta n$, the point at which the minimum refractive index between two layers+$\Delta n/2$ is regarded as being a layer interface.

In the case that the high refractive index layer and the low refractive index layer contain the refractive index adjusting agent, the composition can be observed by a concentration profile of the refractive index adjusting agent. The concentration profile of the refractive index adjusting agent can be seen by performing etching in a depth direction from the surface using a sputtering method, performing sputtering at a rate of 0.5 nm/min with an outermost surface being 0 nm, using an XPS surface analyzer, and measuring an atomic compositional ratio. In addition, it may be confirmed by cutting a lamination film, and analyzing the section with an XPS surface analyzer to measure an atomic compositional ratio.

The XPS surface analyzer is not particularly limited, and any model can be used. As the XPS surface analyzer, for example, ESCALAB-200 R manufactured by VG Scientific can be used. Mg was used for an X-ray anode to perform measurement at an output of 600 W (acceleration voltage of 15 kV, emission current of 40 mA).

[Adhesive Layer]

The optical reflective film according to the present invention may have an adhesive layer. This adhesive layer is generally provided on the surface on the opposite side to the substrate of the dielectric multilayer film, and known release paper or a separator may be further provided thereon. The configuration of the adhesive layer is not particularly limited, and for example, a dry laminating agent, a wet laminating agent, an adhesive, a heat sealing agent, a hot melt agent, and the like may be all used.

As the adhesive, for example, a polyester-based adhesive, a urethane-based adhesive, a polyvinyl acetate-based adhesive, an acrylic adhesive, nitrile rubber, and the like may be used.

For the optical reflective film of the present invention, when sticking it on window glass, a method of spraying water on the window to stick the adhesive layer of the optical reflective film on a glass surface in a wet state, so called, a water sticking method is preferably used, from the viewpoint of re-sticking, repositioning, and the like. Therefore, an acrylic adhesive having weak adhesion under a wet condition in the presence of water is preferably used.

The acrylic adhesive to be used may be any one of solvent-based and emulsion-based adhesives, but, for easily increasing adhesive strength and the like, a solvent-based adhesive is preferred, and among them, those obtained by solution polymerization are preferred. As raw materials in the case of preparing this solvent-based acrylic adhesive by solution polymerization, for example, acrylic acid esters such as ethyl acrylate, butyl acrylate and 2-ethylhexyl acrylate, octyl acrylate as a main monomer to be a skeleton, vinyl acetate, acrylonitrile, styrene, methyl methacrylate, and the like as a comonomer for improving cohesion, and methacrylic acid, acrylic acid, itaconic acid, hydroxy ethyl methacrylate, glycidyl methacrylate, and the like as a monomer containing a functional group for further promoting cross-linking, imparting stable adhesive strength, and also maintaining a certain degree of adhesive strength even in the presence of water. Since the adhesive layer requires high tackiness, as a main polymer, those having a low glass transition temperature (Tg) such as butyl acrylate are particularly useful.

Examples of the commercially available acrylic adhesive may include for example, a Coponyl (registered trademark) series (manufactured by The Nippon Synthetic Chemical Industry Co., Ltd.).

This adhesive layer may contain for example, a stabilizer, a surfactant, an infrared absorbing material, an ultraviolet absorber, a flame retardant, an antistatic agent, an antioxidant, a thermal stabilizer, a lubricant, a filler, a coloring agent, a dye, an adhesion regulator, and the like, as an additive. In particular, in the case of being used for attachment to windows, addition of the ultraviolet absorber is effective, for suppressing degradation of the optical reflective film by ultraviolet rays.

The method of applying the adhesive is not particularly limited, and any known method may be used. For example, a bar coating method, a die coater method, a comma coating method, a gravure roll coater method, a blade coater method, a spray coater method, an air knife coating method, a dip coating method, a transfer method and the like may be used, alone or in combination. However, it is preferred to perform the method continuously in a roll manner, from the viewpoint of economic feasibility and productivity. Application may be performed by using a coating solution in which an adhesive is dissolved in a soluble solvent to form a solution, or dispersed therein, and as the solvent, any known solvent may be used.

In addition, it is preferred that the adhesive layer has a thickness of usually about 1 to 100 μm, from the viewpoint of an adhesion effect, a drying speed and the like.

The adhesive strength is preferably 2 to 30 N/25 mm, more preferably 4 to 20 N/25 mm, as peel strength as measured by a 180° peel test, described in JIS K6854 (1999).

The adhesive layer may be formed by directly applying it on the dielectric multilayer film by the above-described method, or applying it on the release film once and drying it, and then adhering the dielectric multilayer film thereon and transferring the adhesive agent. It is preferred that the remaining solvent is as small as possible, and for that, the drying temperature or time is not specified, but the drying temperature and time at this time is preferably at a temperature of 50 to 150° C. for 10 seconds to 5 minutes.

[Hard Coat Layer]

On the optical reflective film of the present invention, a hard coat layer containing a resin which is cured by heat, ultraviolet rays or the like may be laminated, as a surface protective film for raising abrasion resistance. For example, as a preferred example, a dielectric multilayer film and an adhesive layer are laminated on the surface of a substrate in this order, and further the hard coat layer is coated on the surface of the substrate on the opposite side to the side on which these layers are laminated.

Examples of the cured resin used in the hard coat layer may include a thermosetting resin or an ultraviolet curable resin, but, for easy molding, an ultraviolet curable resin is preferred, and among them, those having a pencil hardness of at least 2H are more preferred. This curable resin may be used alone or in combination of two or more.

Examples of the ultraviolet curable resin may include (meth)acrylate, urethane acrylate, polyester acrylate, epoxy acrylate, an epoxy resin and an oxetane resin, and these may be also used as a solvent-free type resin composition.

In the case of using the ultraviolet curable resin, it is preferred to add a photopolymerization initiator for promoting curing.

Examples of the photopolymerization initiator may include acetophenones, benzophenones, ketals, anthraquinones, thioxanthones, azo compounds, peroxides, 2,3-dialkyldione compounds, disulfide compounds, thiuram compounds, fluoroamine compounds and the like. Specific examples of the photopolymerization initiator may include acetophenones such as 2,2'-diethoxyacetophenone, p-dimethylacetophenone, 1-hydroxycyclohexyl phenyl ketone, 1-hydroxydimethylphenyl ketone, 2-methyl-4'-methylthio-2-morpholinopropiophenone and 2-benzyl-2-dimethylamino-1-(4-morpholinophenyl)-butanone-1, benzoins such as benzoin methylether, benzoin ethylether, benzoin isopropylether and benzyldimethylketal, benzophenones such as benzophenone, 2,4'-dichlorobenzophenone, 4,4'-dichlorobenzophenone and p-chlorobenzophenone, 2,4,6-trimethylbenzoyldiphenylphosphine oxide, anthraquinones, thioxanthones and the like. These photopolymerization initiators may be used alone, in combination of two or more or as a eutectic mixture. In particular, it is preferred to use acetophenones, from stability or polymerization reactivity of the curable composition.

As this photopolymerization initiator, a commercially available product may be used, and for example, IRGACURE (registered trademark) 819, 184, 907 and 651 manufactured by BASF Japan Ltd., and the like may be listed as preferred examples.

This hard coat layer may contain for example, a stabilizer, surfactant, an infrared absorber, an ultraviolet absorber, a flame retardant, an antistatic agent, an antioxidant, a thermal stabilizer, a lubricant, a filler, a coloring agent, a dye, an adhesion regulator and the like, as an additive.

The hard coat layer has a thickness of preferably 0.1 μm to 50 μm, more preferably 1 to 20 μm, from the viewpoint of improving hard coatability and transparency of the optical reflective film.

The method of forming the hard coat layer is not particularly limited, and for example, a method in which a hard coat layer coating solution containing each component is prepared, the coating solution is applied with a wire bar and the like, and cured with heat and/or UV, thereby forming the hard coat layer, may be listed.

[Other Layers]

The optical reflective film according to the present invention may include a layer other than the layers as described above (other layer). For example, an intermediate layer may be provided as other layer. Here, the "intermediate layer" refers to a layer between the substrate and the dielectric multilayer film, or a layer between the substrate and the hard coat layer. Examples of the constituent materials of the intermediate layer may include a polyester resin, a polyvinyl alcohol resin, a polyvinyl acetate resin, a polyvinyl acetal resin, an acrylic resin, a urethane resin, and the like, and the materials having low compatibility with the additive and Tg are preferred, and any material can be used as long as it satisfies the condition. The glass transition temperature (Tg) of the intermediate layer is preferably 30 to 120° C., since sufficient weatherability is obtainable in this range, and more preferably in a range of 30 to 90° C.

The intermediate layer may contain for example, a stabilizer, a surfactant, an infrared absorber, an ultraviolet absorber, a flame retardant, an antistatic agent, an antioxidant, a thermal stabilizer, a lubricant, a filler, a coloring agent, a dye, an adhesion regulator and the like, as the additive.

[Method for Preparing Optical Reflective Film]

The method for preparing the optical reflective film of the present invention is not particularly limited, and any method can be used as long as in the method, at least one unit composed of the high refractive index layer and the low refractive index layer is formed on the substrate, and at least one layer of the high refractive index layer or the low refractive index layer is the water-dispersible cationic urethane resin-containing layer as described above.

Specifically, it is preferred to form a laminate (dielectric multilayer film) by applying the high refractive index layer and the low refractive index layer alternately, and performing drying. Specifically, the following embodiments may be listed: (1) a method of applying a high refractive index layer coating solution on a substrate and performing drying to form a high refractive index layer, and then applying a low refractive index layer coating solution and performing drying to form a low refractive index layer, thereby forming an optical reflective film; (2) applying a low refractive index layer coating solution on a substrate and performing drying to form a low refractive index layer, and then applying a high refractive index layer coating solution and performing drying to form a high refractive index layer, thereby forming an optical reflective film; (3) multilayer-coating a high refractive index layer coating solution and a low refractive index layer coating solution on a substrate alternately and sequentially and performing drying, thereby forming an optical reflective film including a high refractive index layer and a low refractive index layer; and (4) multilayer-coating a high refractive index layer coating solution and a low refractive index layer coating solution on a substrate simultaneously and performing drying, thereby forming an optical reflective film including a high refractive index layer and a low refractive index layer. Among them, the method (4) which is a simpler preparation process is preferred. That is, it is preferred that the method for preparing the optical reflective film of the present invention includes applying the high refractive index layer and the low refractive index layer by a simultaneous multilayer coating method.

In the case of simultaneous multilayer coating, the layers are overlaid in an undried liquid state, and thus, interlayer mixing and the like are more likely to occur. However, it is known that when the water-soluble resin is polyvinyl alcohol, and the saponification degree of polyvinyl alcohol contained in the high refractive index layer and the saponification degree of polyvinyl alcohol contained in the low refractive index layer are different, the compatibility of the polyvinyl alcohol resin having a different saponification degree is low. Therefore, when the high refractive index layer and the low refractive index layer are overlaid in an undried liquid state, even in the case that each layer are somewhat mixed, water which is a solvent in a drying process is volatilized so that concentration occurs. Then, the polyvinyl alcohol resins having different saponification degrees cause phase separation, and force to minimize the area of the interface of each layer is applied, thereby suppressing interphase mixing and decreasing interfacial disturbance. Therefore, it is possible to obtain an optical reflective film having excellent light reflection properties in a desired wavelength region, and small haze.

As a coating method, for example, a roll coating method, a rod bar coating method, an air knife coating method, a spray coating method, a curtain coating method, a slide bead coating method using a hopper described in U.S. Pat. Nos. 2,761,419 and 2,761,791, an extrusion coating method, or the like are preferably used.

A solvent for preparing the high refractive index layer coating solution and the low refractive index layer coating solution is not particularly limited, but water, an organic solvent or a mixed solvent thereof is preferred. Since a water-soluble resin is used in the present invention, an aqueous solvent can be used. Since the aqueous solvent does not require large scale production equipment, as compared with the case of using an organic solvent, it is preferred from the viewpoint of productivity, and also environmental protection.

Examples of the organic solvent may include alcohols such as methanol, ethanol, 2-propanol and 1-butanol, esters such as ethyl acetate, butyl acetate, propyleneglycol monomethylether acetate and propyleneglycol monoethylether acetate, ethers such as diethyl ether, propyleneglycol monomethyl ether and ethyleneglycol monoethylether, amides such as dimethyl formamide and N-methyl pyrrolidone, ketones such as acetone, methylethyl ketone, acetylacetone and cyclohexanone, and the like. These organic solvent may be used in alone or in combination of two or more. As the solvent of the coating solution, the aqueous solvent is preferred, water, or a mixed solvent of water with methanol, ethanol or ethyl acetate is more preferred, and water is particularly preferred, from environmental aspects and ease of operation, and the like.

When using a mixed solvent of water and a small amount of organic solvent, the content of water in the mixed solvent is preferably 80 to 99.9% by mass, and more preferably 90 to 99.5% by mass, based on 100% by mass of the total mixed solvent. Here, when the content is 80% by mass or more, volume change due to volatilization of the solvent may be reduced, and handling is improved, and when the content is 99.9% by mass or less, homogeneity at the time of adding liquid can be increased to obtain stable liquid physical properties.

It is preferred that the concentration of the water-soluble resin in the high refractive index layer coating solution is 0.5 to 10% by mass. In addition, it is preferred that the concentration of the refractive index adjusting agent in the high refractive index layer coating solution is 1 to 50% by mass.

It is preferred that the concentration of the water-soluble resin in the low refractive index layer coating solution is 0.5 to 10% by mass. In addition, it is preferred that the concentration of the refractive index adjusting agent in the low refractive index layer coating solution is 1 to 50% by mass.

The method for preparing the high refractive index layer coating solution and the low refractive index layer coating solution is not particularly limited, and for example, a method of adding a refractive index adjusting agent, a water-soluble resin, a curing agent and the like to an aqueous solvent, and stirring and mixing them may be listed. Here, the order of mixing each component is not particularly limited, and each component may be sequentially added with stirring and mixed, or added at the same time with stirring and mixed.

In the case that at least one layer of the high refractive index layers is water-dispersible cationic urethane resin-containing layer, a water-dispersible cationic urethane resin and a cationic polymer having a tertiary amino group or a cation (salt) thereof or a quaternary ammonium group are added to the high refractive index layer coating solution as described above to prepare a water-dispersible cationic urethane resin-containing layer coating solution (water-dispersible cationic urethane resin-containing high refractive index layer coating solution). The water-dispersible cationic urethane resin-containing layer coating solution is applied and dried, thereby obtaining the water-dispersible cationic urethane resin-containing layer functioning as the high refractive index layer.

Likewise, in the case that at least one layer of the low refractive index layers is the water-dispersible cationic urethane resin-containing layer, a water-dispersible cationic urethane resin and a cationic polymer having a tertiary amino group or a cation (salt) thereof or a quaternary ammonium group are added to the low refractive index layer coating solution as described above to prepare a water-dispersible cationic urethane resin-containing layer coating solution (water-dispersible cationic urethane resin-containing low refractive index layer coating solution). The water-dispersible cationic urethane resin-containing layer coating solution is applied and dried, thereby obtaining the water-dispersible cationic urethane resin-containing layer functioning as the low refractive index layer.

In addition, the concentration of the water-dispersible cationic urethane resin, and the concentration of the cationic polymer having a tertiary amino group or a cation (salt) thereof or a quaternary ammonium group in the water-dispersible cationic urethane resin-containing layer coating solution are not particularly limited. However, it is preferred that the content (solid content) of the water-dispersible cationic urethane resin in the water-dispersible cationic urethane resin-containing layer, and the mass ratio (solid content ratio) of the cationic polymer relative to the water-dispersible cationic urethane resin are adjusted to the ranges as described above.

Accordingly, the method for preparing the optical reflective film of the present invention includes dissolving or dispersing a water-soluble resin, a refractive index adjusting agent, a water-dispersible cationic urethane resin, and a cationic polymer having a tertiary amino group or a cation (salt) thereof or a quaternary ammonium group to an aqueous solvent to prepare a coating solution; and applying the coating solution to form the water-dispersible cationic urethane resin-containing layer.

The temperature of the high refractive index layer coating solution and the low refractive index layer coating solution at the time of performing simultaneous multilayer coating is preferably 25 to 60° C., and more preferably 30 to 45° C., in the case of using a slide bead coating method. In addition, in the case of using a curtain coating method, a temperature in a range of 25 to 60° C. is preferred, and a temperature in a range of 30 to 45° C. is more preferred.

The viscosity of the high refractive index layer coating solution and the low refractive index layer coating solution at the time of performing simultaneous multilayer coating is not particularly limited. However, in the case of using a slide bead coating method, the viscosity is preferably in a range of 5 to 160 mPa·s, and more preferably in a range of 60 to 140 mPa·s, in a preferred temperature range of the coating solution as described above. In addition, in the case of using a curtain coating method, the viscosity is preferably in a range of 5 to 1200 mPa·s, and still more preferably in a range of 25 to 500 mPa·s, in a preferred temperature range of the coating solution as described above. Within this range, simultaneous multilayer coating can be efficiently performed.

In addition, the viscosity of the coating solution at 15° C. is preferably 100 mPa·s or more, more preferably 100 to 30,000 mPa·s, still more preferably 2, 500 to 30,000 mPa·s.

The conditions of the coating and drying method are not particularly limited, however, for example, in the case of a sequential coating method, first, any one of the high refractive index layer coating solution and the low refractive index layer coating solution heated to 30 to 60° C. is applied on a substrate and dried to form a layer, and then the other coating solution is applied on this layer and dried to form a laminated film precursor (unit). Next, the number of units needed to express desired optical reflection performance is sequentially applied, dried and laminated by the above method to obtain a laminated film precursor. At the time of drying, it is preferred to dry the formed coated film at 30° C. or more. For example, it is preferred that drying is performed at a wet bulb temperature in a range of 5 to 50° C. and a membrane surface temperature in a range of 5 to 100° C. (preferably 10 to 50° C.), and for example, drying is performed by blowing hot air at 40 to 60° C. for 1 to 5 seconds. As a drying method, hot air drying, infrared drying, or microwave drying are used. In addition, drying in a multistage process is more preferred than drying in a single process, and the temperature of a constant rate drying section<the temperature of a decreasing rate drying section is more preferred. It is preferred that the temperature range of the constant rate drying section in this case is 30 to 60° C., and the temperature range of the decreasing rate drying section is 50 to 100° C.

In addition, the conditions of the coating and drying method in the case of performing simultaneous multilayer coating are preferably as follows: the high refractive index layer coating solution and the low refractive index layer coating solution are heated to 30 to 60° C., simultaneous multilayer coating of the high refractive index layer coating solution and the low refractive index layer coating solution on a substrate is performed, then the temperature of the formed coated film is once cooled to 1 to 15° C. (set), and thereafter, drying is performed at 10° C. or more. More preferred drying conditions are a wet bulb temperature in a range of 5 to 50° C., and a membrane surface temperature in a range of 10 to 50° C. For example, drying is performed by blowing hot air at 40 to 80° C. for 1 to 5 seconds. In addition, as the cooling method right after coating, it is preferred to perform it by a horizontal set method, from the viewpoint of improving uniformity of the formed coated film.

Here, the set refers to a process of increasing the viscosity of a coating film composition and decreasing fluidity of the material between and within each layer or gelling the material by means such as those applying cold air and the like to a coated film to lower the temperature. A state in which cold air is blown to a coated film from a surface, so that when a finger is pressed against the surface of the coated film, nothing is stuck on the finger is defined as a set completed state.

The time from application to set completion by blowing cold air (set time) is preferably within 5 minutes, more preferably within 2 minutes. In addition, the lower limit thereof is not particularly limited, but 45 seconds or more is preferred.

The set time can be adjusted by adjusting the concentration of polyvinyl alcohol, or the concentration of inorganic oxide particles, or adding other components, for example, various known gelling agents such as gelatin, pectin, agar, carrageenan and gellan gum.

The temperature of the cold air is preferably 0 to 25° C., more preferably 5 to 10° C. In addition, the time during which the coated film is exposed to cold air is affected by the transport speed of the coated film, but preferably 10 to 360 seconds, more preferably 10 to 300 seconds, still more preferably 10 to 120 seconds.

The coated thickness of the high refractive index layer coating solution and the low refractive index layer coating solution may be such that the preferred dried thickness as described above is obtained by coating.

<Optical Reflector>

The optical reflective film of the present invention can be applied to a wide range of field. Accordingly, one embodiment of the present invention is an optical reflector formed by providing the optical reflective film on at least one surface of a base. For example, it is used mainly for the purpose of increasing weatherability, as a film for attaching to windows such as a heat ray reflective film which are attached to facilities (base) exposed to sunlight for a long period of time, such as outdoor windows of a building, or automobile windows, thereby imparting a heat ray reflection effect, a film for agricultural vinyl greenhouse, and the like. In particular, it is preferred for a member in which the optical reflective film according to the present invention is attached to the base such as glass or glass substitution resin through the adhesive layer.

Specific examples of the base may include glass, a polycarbonate resin, a polysulfone resin, an acrylic resin, a polyolefin resin, a polyether resin, a polyester resin, a polyamide resin, a polysulfide resin, an unsaturated polyester resin, an epoxy resin, a melamine resin, a phenol resin, a diallyl phthalate resin, a polyimide resin, a urethane resin, a polyvinyl acetate resin, a polyvinyl alcohol resin, a styrene resin, a vinyl chloride resin, a metal plate, ceramics and the like. The type of resins may be any one of thermoplastic resin, thermosetting resin and ionizing radiation curable resins, and may be used in combination of two or more of them. The base can be manufactured by a known method such as extrusion molding, calendar molding, injection molding, hollow molding and compression molding. The thickness of the base is not particularly limited, but it is generally 0.1 mm to 5 cm.

When the adhesive layer for bonding the optical reflective film and the base is attached to window glass and the like, it is preferred to provide it so that the optical reflective film is on the sunlight (heat ray) incident surface. In addition, it is preferred for durability that the optical reflective film is sandwiched between window glass and a substrate, since it can be sealed from ambient gas such as moisture. It is also preferred that the optical reflective film of the present invention is provided outdoors or outside of cars (for external attachment), due to environmental durability.

[Laminated Glass]

The laminated glass is a member in which the optical reflective film according to the present invention is attached to the base of glass through an intermediate film. The laminated glass can be used for buildings, residential application, cars, or the like.

One embodiment of the laminated glass has a structure in which the optical reflective film is sandwiched between two sheets of plate glass, using two intermediate films. The optical reflective film is the optical reflective film of the present invention as described above. The optical reflective film may have a configuration in which a reflective layer is laminated on one surface of a substrate, and a hard coat layer is coated on the other surface. In addition, the optical reflective film may have a configuration in which the surface of the substrate having the reflective layer laminated on the other surface, and the surface of the substrate having the hard coat layer laminated on the other surface are bonded with the adhesive layer.

Other constituent members of the laminated glass are described below.

Intermediate Film

A pair of intermediate films sandwiching the optical reflective film may be any film as long as they have adhesion performance for bonding the optical reflective film and glass plate, but it is preferred to contain a thermoplastic resin. A pair of intermediate films may be an identical type or a different type. Examples of the thermoplastic resin may include ethylene-vinyl acetate copolymer (EVA) or polyvinylbutyral (PVB), and among them, PVB is preferred. In addition, to each intermediate film, an infrared absorber (e.g., fine particles absorbing infrared rays and the like), an ultraviolet absorber, an antioxidant, an antistatic agent, a thermal stabilizer, a lubricant, a filler, a coloring agent, a dye, an adhesion regulator and the like may be appropriately added, and combined. Within the range not inhibiting the visible light transmittance, it is more preferable that various fine particles absorbing infrared rays, ultraviolet absorber, or the like is contained therein, or a dye is incorporated thereto to perform coloring, thereby making sunlight transmittance 75% or more.

Examples of the fine particles absorbing infrared rays may include metal fine particles such as Ag, Al and Ti, fine particles of metal nitrides and metal oxides, cesium-doped tungsten oxide (CWO), and also conductive transparent metal oxide fine particles such as ITO, ATO, aluminum zinc composite oxide (AZO), gallium-doped zinc oxide (GZO), indium zinc composite oxide (IZO), and among them, one or more are selected and contained in the intermediate film, thereby improving thermal insulation performance. In particular, conductive transparent metal oxide fine particles such as ITO, ATO, AZO, GZO and IZO are preferred.

Glass Plate

The type of a pair of glass plates sandwiching the optical reflective film and a pair of intermediate films is not particularly limited. It may be selected depending on the light transmittance performance or the thermal insulation performance required for use, and may be any one of an inorganic glass plate, an organic glass plate and an organic inorganic hybrid glass plate. The inorganic glass plate is not particularly limited, and examples thereof may include various inorganic glass plates such as a float glass plate, a polished glass plate, a mold glass plate, a meshed glass plate, a wire glass plate, a heat ray absorbing glass plate and a colored glass plate. Examples of the organic glass plate may include glass plates formed of a polycarbonate resin, a polystyrene resin, a polymethyl methacrylate resin and the like. These organic glass plates may be a laminate formed by laminating a plurality of sheets made of the resins. Examples of the organic inorganic hybrid glass plate may include a hybrid glass plate in which silica is dispersed in a resin such as an epoxy resin. The color of the glass plate is not limited to a transparent color, and may be various colors such as green, brown and blue used in vehicles and the like. The type of glass plate may be identical or used in combination of two or more.

It is preferred that the glass plate has a thickness of about 1 to 10 mm, considering the strength and the transmittance of infrared light in the visible light region. It is preferred that the glass plate having a curved surface shape has a curvature radius of a glass plate of 0.5 to 2.0 m. When the curvature radius of the glass plate is within this range, the optical reflective film can conform to the curved surface shape of glass.

The thermal insulation performance and the solar heat shielding performance of the optical reflective film or an infrared shield can be generally measured by a method in accordance with JIS R 3209 (1998) (multilayer glass), JIS R 3106 (1998) (test method of transmittance, reflectance, emissivity, solar heat acquisition rate of plate glasses), and JIS R 3107 (1998) (calculation method of thermal resistance of plate glasses and thermal conductivity in buildings).

Measurement of solar radiation transmittance, solar radiation reflectance, emissivity and visible light transmittance is performed as follows: (1) A spectrophotometer having a wavelength (300 to 2500 nm) is used to measure spectral transmittance and spectral reflectance of various single plate glasses. In addition, a spectrometer of a wavelength of 5.5 to 50 μm was used to measure emissivity. As the emissivity of a float plate glass, a polished plate glass, a mold plate glass and a heat ray absorbing plate glass, default values are used. (2) For calculation of solar radiation transmittance, solar radiation reflectance, a solar radiation absorption rate, and corrected emissivity, solar radiation transmittance, solar radiation reflectance, solar radiation absorption rate, and vertical emissivity are calculated in accordance with JIS R 3106 (1998). The corrected emissivity is determined by multiplying the coefficient indicated in JIS R 3107 (1998) by the vertical emissivity. Calculation of the thermal insulation property and the solar heat shielding property is performed as follows: (1) The measured value of a thickness and the corrected emissivity are used to calculate the thermal resistance of multilayer glass in accordance with JIS R 3209 (1998). However, when a hollow layer has a thickness more than 2 mm, a gas thermal conductance of the hollow layer is determined in accordance with JIS R 3107 (1998). (2) The thermal insulation is determined as a heat flow resistance by adding heat transfer resistance to the thermal resistance of multilayer glass. (3) The solar heat shielding property is calculated by determining a solar heat acquisition rate in accordance with JIS R 3106 (1998), and subtracting it from 1.

EXAMPLES

Hereinafter, the present invention is specifically described by the following Examples. However, the present invention is not limited thereto. In the Examples, "part" or "%" refers to "part by mass" or "% by mass", respectively, unless otherwise particularly stated. In addition, unless otherwise particularly stated, each operation is performed at room temperature (25° C.).

<<Manufacture of Optical Reflective Film>>

<Preparation of High Refractive Index Layer Coating Solution 1>

175.4 g of citric acid (1.9% by mass aqueous solution) was added to 384.8 g of 30% by mass cerium oxide sol (NYACOL CEO2(AC)-30, particle size 10 to 30 nm, manufactured by Nyacol Nano Technologies). 1.94 g of a 5% by mass aqueous solution of SOFTAZLINE (registered trademark) LMEB-R (manufactured by Kawaken Fine Chemicals Co., Ltd.) as a surfactant was added thereto, and heated to 40° C. In addition, 120.4 g of a 8% by mass aqueous solution of polyvinyl alcohol (EXCEVAL (registered trademark) RS-2117, average polymerization degree of 1700, saponification degree of 97.5 to 99.0 mol %, manufactured by KURARAY CO., LTD.) was added thereto, and 9.9 g of pure water was further added. After stirring for 10 minutes, 240.8 g of a 6% by mass aqueous solution of polyvinyl alcohol (JC-40, average polymerization degree of 4000, saponification degree of 99.0 mol % or more, manufactured by JAPAN VAM & POVAL CO., LTD.), and 66.7 g of pure water were added. Thereafter, stirring was performed at 40° C., thereby obtaining a high refractive index layer coating solution 1. The film obtained by coating the high refractive index layer coating solution 1 had a refractive index of 1.75. In addition, a method of measuring a refractive index is as follows (hereinafter the same).

<Measurement of Single Film Refractive Index of Each Layer>

In order to measure a refractive index, a sample in which the high refractive index layer coating solution 1 was applied in a single layer on a substrate was manufactured, this sample was cut into 10 cm×10 cm, and the refractive index was determined by the following method. Using a spectrophotometer U-4100 (solid sample measurement system) manufactured by Hitachi Ltd., the surface on the opposite side to the measurement surface (back surface) of each sample were roughened, light absorption treatment was performed with black spray to prevent light reflection on the back surface, thereby measuring the refractive index in a visible light region (400 nm to 700 nm) under a 5° specular reflection condition, and the refractive index was determined from the result.

<Preparation of High Refractive Index Layer Coating Solution 2>

175.4 g of citric acid (1.9% by mass aqueous solution) was added to 384.8 g of 30% by mass of zirconia sol (SZR-W, particle size distribution: D50 3 nm to 5 nm, manufactured by Sakai Chemical Industry Co., Ltd.). 1.94 g of a 5% by mass aqueous solution of SOFTAZLINE (registered trademark) LMEB-R (manufactured by Kawaken Fine Chemicals Co., Ltd.) as a surfactant was added thereto, and heated to 40° C. In addition, 120.4 g of a 8% by mass aqueous solution of polyvinyl alcohol (EXCEVAL (registered trademark) RS-2117, average polymerization degree of 1700, saponification degree of 97.5 to 99.0 mol %, manufactured by KURARAY CO., LTD.) was added thereto, and 9.9 g of pure water was further added. After stirring for 10 minutes, 240.8 g of a 6% by mass aqueous solution of polyvinyl alcohol (JC-40, average polymerization degree of 4000, saponification degree of 99.0 mol % or more, manufactured by JAPAN VAM & POVAL CO., LTD.), and 66.7 g of pure water were added. Thereafter, stirring was performed at 40° C., thereby obtaining a high refractive index layer coating solution 2. The film obtained by coating the high refractive index layer coating solution 2 had a refractive index of 1.73.

<Preparation of High Refractive Index Layer Coating Solution 3>

(Preparation of Silica-Deposited Titanium Dioxide Sol)

First, a silica-deposited titanium dioxide sol containing rutile type titanium dioxide was prepared, as follows:

2 parts by mass of pure water was added to 0.5 parts by mass of titanium oxide sol having a solid content of 15.0% by mass (SRD-W, volume average particle size: 5 nm, rutile type titanium dioxide particles, manufactured by Sakai Chemical Industry Co., Ltd.), and heated to 90° C. Next, 0.5 parts by mass of a silicic acid aqueous solution (sodium silicate No. 4, manufactured by Nippon Chemical Industrial CO., LTD. was diluted with pure water so that the concentration of $SiO_2$ is 0.5% by mass) was slowly added thereto, heat treatment was performed at 175° C. for 18 hours in an autoclave, and after cooling, the solution was concentrated with an ultrafiltration membrane, thereby obtaining titanium dioxide sol with $SiO_2$ attached to the surface, having a solid concentration of $SiO_2$ of 6% by mass to titanium dioxide (hereinafter, referred to as silica-deposited titanium dioxide sol) (volume average particle size: 9 nm).

30 parts by mass of the silica-deposited titanium dioxide sol of 20.0% by mass containing silica-attached rutile type titanium oxide particles (volume average particle size: 9 nm) as prepared above was mixed with and dispersed in 20 parts by mass of a 10% by mass aqueous solution of modified PVA (AZF8035W, average polymerization degree: 300, saponification degree: 98.5%, manufactured by The Nippon Synthetic Chemical Industry Co., Ltd.), and the preparation was finished to 90 parts by mass with pure water, thereby preparing a titanium oxide dispersion.

Then, 30 parts by mass of a 5% by mass aqueous solution of polyvinyl alcohol (PVA224, average polymerization degree: 2400, saponification degree: 88%, manufactured by KURARAY CO., LTD.) was added to and mixed with 90 parts by mass of the titanium oxide dispersion, 0.2 parts by mass of a 5% by mass aqueous solution of NIKKOL (registered trademark) CA-3475 V (manufactured by Nikko Chemicals Co., Ltd.) as a cationic surfactant was further added, and finally, the preparation was finished to 180 parts by mass with pure water, thereby preparing a high refractive index layer coating solution 3. The film obtained by coating the high refractive index layer coating solution 1 had a refractive index of 1.80.

<Preparation of Low Refractive Index Layer Coating Solution 1>

In a stirring vessel, 2.62 g of methyl diallylamine hydrochloride polymer (containing tertiary amine cation) PAS M-1 (weight average molecular weight of 20,000, 50% by mass aqueous solution, manufactured by NITTOBO MEDICAL CO., LTD.) and 28.1 g of boric acid (3% by mass aqueous solution) were mixed. 356.41 g of a 10% by mass aqueous solution of acidic colloidal silica (SNOWTEX (registered trademark) OXS, primary particle size: 5.4 nm, manufactured by Nissan Chemical Industries, Limited) was added thereto. This was heated to 40° C. with stirring. A mixed solution of 502.72 g of a 8% by mass aqueous solution of polyvinyl alcohol (JP-45, average polymerization degree, saponification degree: 86.5 to 89.5 mol %, manufactured by JAPAN VAM & POVAL CO., LTD.), 19.89 g of a 5% by mass aqueous solution of SOFTAZLINE (registered trademark) LMEB-R (manufactured by Kawaken Fine Chemicals Co., Ltd.) as a surfactant, and 90 g of pure water was added thereto, and stirred at 40° C., thereby obtaining a low refractive index layer coating solution 1. The film obtained by coating the low refractive index layer coating solution 1 had a refractive index of 1.50.

<Preparation of Water-Dispersible Cationic Urethane Resin-Containing Low Refractive Index Layer Coating Solution 1>

In a stirring vessel, 0.33 g of methyl diallylamine hydrochloride polymer (containing tertiary amine cation) PAS M-1 (weight average molecular weight of 20,000, 50% by mass aqueous solution, manufactured by NITTOBO MEDICAL CO., LTD.) and 28.1 g of boric acid (3% by mass aqueous solution) were mixed. 356.41 g of polymethylsilsesquioxane (PMSQ) sol (10% by mass aqueous dispersion) SP-1120 (H2O) (particle size 20 nm, manufactured by KONISHI CHEMICAL INC. CO., LTD.) was added thereto. This was heated to 40° C. with stirring. A mixed solution of 502.72 g of a 8% by mass aqueous solution of polyvinyl alcohol (PVA-224, average polymerization degree of 2400, saponification degree: 87 to 89 mol %, manufactured by KURARAY CO., LTD.), 5.3 g of a 30% by mass aqueous dispersion of water-dispersible cationic urethane resin (ester-based) (SUPERFLEX (registered trademark) 620, average particle size 20 nm, manufactured by DKS Co. Ltd.), 19.89 g of a 5% by mass aqueous solution of SOFTAZLINE (registered trademark) LMEB-R (manufactured by Kawaken Fine Chemicals Co., Ltd.) as a surfactant, and 87 g of pure water was added thereto, and stirred at 40° C., thereby obtaining a water-dispersible cationic urethane resin-containing low refractive index layer coating solution 1.

Then, it was confirmed that the water-dispersible cationic urethane resin is a cationic resin, by measuring zeta potential. The specific measurement method is as follows.

Apparatus: Zetasizer Nano ZSP manufactured by Malvern

Measurement method: electrophoresis light scattering method

Sample preparation: measuring a solution in which the water-dispersible cationic urethane resin is diluted to 1% by mass.

The water-dispersible cationic urethane resin-containing low refractive index layer coating solution 1 had a refractive index of 1.50.

<Preparation of Water-Dispersible Cationic Urethane Resin-Containing Low Refractive Index Layer Coating Solution 2>

In a stirring vessel, 0.16 g of methyl diallylamine hydrochloride polymer (containing tertiary amine cation) PAS M-1 (weight average molecular weight of 20,000, 50% by mass aqueous solution, manufactured by NITTOBO MEDICAL CO., LTD.) and 28.1 g of boric acid (3% by mass aqueous solution) were mixed. 356.41 g of polymethylsilsesquioxane (PMSQ) sol (10% by mass aqueous dispersion) SP-1120 (H2O) (particle size 20 nm, manufactured by KONISHI CHEMICAL INC. CO., LTD.) was added thereto. This was heated to 40° C. with stirring. A mixed solution of 502.0 g of 8% by mass aqueous solution of polyvinyl alcohol (PVA-224, average polymerization degree of 2400, saponification degree of 87 to 89 mol %, manufactured by KURARAY CO., LTD.), 2.67 g of a 30% by mass aqueous dispersion of water-dispersible cationic urethane resin (ester-based) (SUPERFLEX (registered trademark) 620, average particle size 20 nm, manufactured by DKS Co. Ltd.), 19.89 g of a 5% by mass aqueous solution of SOFTAZLINE (registered trademark) LMEB-R (manufactured by Kawaken Fine Chemicals Co., Ltd.) as a surfactant, and 90 g of pure water was added thereto, and stirred at 40° C., thereby obtaining a water-dispersible cationic urethane resin-containing low refractive index layer coating solution 2. A single layer manufactured by using the water-dispersible cationic urethane resin-containing low refractive index layer coating solution 2 had a refractive index identical to the case of using the water-dispersible cationic urethane resin-containing low refractive index layer coating solution 1.

<Preparation of Water-Dispersible Cationic Urethane Resin-Containing Low Refractive Index Layer Coating Solution 3>

In a stirred vessel, 3.8 g of methyl diallylamine hydrochloride polymer (containing tertiary amine cation) PAS M-1 (weight average molecular weight of 20,000, 50% by mass aqueous solution, manufactured by NITTOBO MEDICAL CO., LTD.), and 28.1 g of boric acid (3% by mass aqueous solution) was mixed. 356.41 g of polymethylsilsesquioxane (PMSQ) sol (10% by mass aqueous dispersion) SP-1120 (H2O) (particle size 20 nm, manufactured by KONISHI CHEMICAL INC. CO., LTD.) was added thereto. This was heated to 40° C. with stirring. A mixed solution of 244 g of a 8% by mass aqueous solution of polyvinyl alcohol (PVA-224, average polymerization degree of 2400, saponification degree of 87 to 89 mol %, manufactured by KURARAY CO., LTD.), 66.2 g of a 30% by mass aqueous dispersion of water-dispersible cationic urethane resin (ester-based) (SUPERFLEX (registered trademark) 620, average particle size 20 nm, manufactured by DKS Co. Ltd.), 19.89 g of a 5% by mass aqueous solution of SOFTAZLINE (registered trademark) LMEB-R (manufactured by Kawaken Fine Chemicals Co., Ltd.) as a surfactant, and 281 g of pure water was added thereto, and stirred at 40° C., thereby obtaining a water-dispersible cationic urethane resin-containing low refractive index layer coating solution 3. A single layer manufactured by using the water-dispersible cationic urethane resin-containing low refractive index layer coating solution 3 had a refractive index identical to the case of using the water-dispersible cationic urethane resin-containing low refractive index layer coating solution 1.

<Preparation of Water-Dispersible Cationic Urethane Resin-Containing Low Refractive Index Layer Coating Solution 4>

In a stirring vessel, 13.50 g of methyl diallylamine hydrochloride polymer (containing tertiary amine cation) PAS M-1 (manufactured by 20,000, 50% by mass aqueous solution, NITTOBO MEDICAL CO., LTD.), and 28.1 g of boric acid (3% by mass aqueous solution) were mixed. 356.41 g of polymethylsilsesquioxane (PMSQ) sol (10% by mass aqueous dispersion) SP-1120 (H2O) (particle size 20 nm, manufactured by KONISHI CHEMICAL INC. CO., LTD.) was added thereto. This was heated to 40° C. with stirring. A mixed solution of 502.72 g of a 8% by mass aqueous solution of polyvinyl alcohol (PVA-224, average polymerization degree of 2400, saponification degree of 87 to 89 mol %, manufactured by KURARAY CO., LTD.), 5.7 g of a 30% by mass aqueous dispersion of water-dispersible cationic urethane resin (ester-based) (SUPERFLEX (registered trademark) 620, average particle size 20 nm, manufactured by DKS Co. Ltd.), 19.89 g of a 5% by mass aqueous solution of SOFTAZLINE (registered trademark) LMEB-R (manufactured by Kawaken Fine Chemicals Co., Ltd.) as a surfactant, and 74 g of pure water was added thereto, and stirred at 40° C., thereby obtaining a water-dispersible cationic urethane resin-containing low refractive index layer coating solution 4. A single layer manufactured by using the water-dispersible cationic urethane resin-containing low refractive index layer coating solution 4 had a refractive index identical to the case of using the water-dispersible cationic urethane resin-containing low refractive index layer coating solution 1.

<Preparation of Water-Dispersible Cationic Urethane Resin-Containing Low Refractive Index Layer Coating Solution 5>

In a stirring vessel, 0.65 g of methyl diallylamine hydrochloride polymer (containing tertiary amine cation) PAS M-1 (weight average molecular weight of 20,000, 50% by mass aqueous solution, manufactured by NITTOBO MEDICAL CO., LTD.), and 28.1 g of boric acid (3% by mass aqueous solution) were mixed. 356.41 g of polymethylsilsesquioxane (PMSQ) sol (10% by mass aqueous dispersion) SP-1120 (H2O) (particle size 20 nm, manufactured by KONISHI CHEMICAL INC. CO., LTD.) was added thereto. This was heated to 40° C. with stirring. A mixed solution of 502.72 g of a 8% by mass aqueous solution of polyvinyl alcohol (PVA-224, average polymerization degree of 2400, saponification degree of 87 to 89 mol %, manufactured by KURARAY CO., LTD.), 5.3 g of a 30% by mass aqueous dispersion of water-dispersible cationic urethane resin (ester-based) (SUPERFLEX (registered trademark) 620, average particle size 20 nm, manufactured by DKS Co. Ltd.), 19.89 g of a 5% by mass aqueous solution of SOFTAZLINE (registered trademark) LMEB-R (manufactured by Kawaken Fine Chemicals Co., Ltd.) as a surfactant, and 87 g of a pure water was added thereto, and stirred at 40° C., thereby obtaining water-dispersible cationic urethane resin-containing low refractive index layer coating solution 5. A single layer manufactured by using the water-dispersible cationic urethane resin-containing low refractive index layer coating solution 5 had a refractive index identical to the case of using the water-dispersible cationic urethane resin-containing low refractive index layer coating solution 1.

<Preparation of Water-Dispersible Cationic Urethane Resin-Containing Low Refractive Index Layer Coating Solution 6>

In a stirring vessel, 6.55 g of methyl diallylamine hydrochloride polymer (containing tertiary amine cation) PAS M-1 (weight average molecular weight of 20,000, 50% by mass aqueous solution, manufactured by NITTOBO MEDICAL CO., LTD.), and 28.1 g of boric acid (3% by mass aqueous solution) were mixed. 356.41 g of polymethylsilsesquioxane (PMSQ) sol (10% by mass aqueous dispersion) SP-1120 (H2O) (particle size 20 nm, manufactured by KONISHI CHEMICAL INC. CO., LTD.) was added thereto. This was heated to 40° C. with stirring. A mixed solution of 502.72 g of a 8% by mass aqueous solution of polyvinyl alcohol (PVA-224, average polymerization degree of 2400, saponification degree of 87 to 89 mol %, manufactured by KURARAY CO., LTD.), 5.5 g of a 30% by mass aqueous dispersion of water-dispersible cationic urethane resin (ester-based) (SUPERFLEX (registered trademark) 620, average particle size 20 nm, manufactured by DKS Co. Ltd.), 19.89 g of a 5% by mass aqueous solution of SOFTAZLINE (registered trademark) LMEB-R (manufactured by Kawaken Fine Chemicals Co., Ltd.) as a surfactant, and 83 g of pure water was added thereto, and stirred at 40° C., thereby obtaining water-dispersible cationic urethane resin-containing low refractive index layer coating solution 6. A single layer manufactured by using the water-dispersible cationic urethane resin-containing low refractive index layer coating solution 6 had a refractive index identical to the case of using the water-dispersible cationic urethane resin-containing low refractive index layer coating solution 1.

<Preparation of Water-Dispersible Cationic Urethane Resin-Containing Low Refractive Index Layer Coating Solution 7>

In a stirring vessel, 2.62 g of methyl diallylamine hydrochloride polymer (containing tertiary amine cation) PAS M-1 (weight average molecular weight of 20,000, 50% by mass aqueous solution, manufactured by NITTOBO MEDICAL CO., LTD.), and 28.1 g of boric acid (3% by mass aqueous solution) were mixed. 356.41 g of polymethylsilsesquioxane (PMSQ) sol (10% by mass aqueous dispersion) SP-1120 (H2O) (particle size 20 nm, manufactured by KONISHI CHEMICAL INC. CO., LTD.) was added thereto. This was heated to 40° C. with stirring. A mixed solution of 502.72 g of a 8% by mass aqueous solution of polyvinyl alcohol (PVA-224, average polymerization degree of 2400, saponification degree of 87 to 89 mol %, manufactured by KURARAY CO., LTD.), 5.5 g of a 30% by mass aqueous dispersion of water-dispersible cationic urethane resin (ester-based) (SUPERFLEX (registered trademark) 620, average particle size 20 nm, manufactured by DKS Co. Ltd.), 19.89 g of a 5% by mass aqueous solution of SOFTAZLINE (registered trademark) LMEB-R (manufactured by Kawaken Fine Chemicals Co., Ltd.) as a surfactant, and 83 g of pure water was added thereto, and stirred at 40° C., thereby obtaining a water-dispersible cationic urethane resin-containing low refractive index layer coating solution 7. A single layer manufactured by using the water-dispersible cationic urethane resin-containing low refractive index layer coating solution 7 had a refractive index identical to the case of using the water-dispersible cationic urethane resin-containing low refractive index layer coating solution 1.

<Preparation of Water-Dispersible Cationic Urethane Resin-Containing Low Refractive Index Layer Coating Solution 8>

In a stirring vessel, 4.68 g of diallyl dimethyl ammonium chloride polymer (containing quaternary ammonium group) PAS H-1 L (weight average molecular weight of 8,500, 28% by mass aqueous solution, manufactured by NITTOBO MEDICAL CO., LTD.), and 28.1 g of boric acid (3% by mass aqueous solution) were mixed. 356.41 g of polymethylsilsesquioxane (PMSQ) sol (10% by mass aqueous dispersion) SP-1120 (H2O) (particle size 20 nm, manufactured by KONISHI CHEMICAL INC. CO., LTD.) was added thereto. This was heated to 40° C. with stirring. A mixed solution of 502.72 g of a 8% by mass aqueous solution of polyvinyl alcohol (PVA-224, average polymerization degree of 2400, saponification degree of 87 to 89 mol %, manufactured by KURARAY CO., LTD.), 5.5 g of a 30% by mass aqueous dispersion of water-dispersible cationic urethane resin (ester-based) (SUPERFLEX (registered trademark) 620, average particle size 20 nm, manufactured by DKS Co. Ltd.), 19.89 g of a 5% by mass aqueous solution of SOFTAZLINE (registered trademark) LMEB-R (manufactured by Kawaken Fine Chemicals Co., Ltd.) as a surfactant, and 83 g of pure water was added thereto, and stirred at 40° C., thereby obtaining a water-dispersible cationic urethane resin-containing low refractive index layer coating solution 8. A single layer manufactured by using the water-dispersible cationic urethane resin-containing low refractive index layer coating solution 8 had a refractive index identical to the case of using the water-dispersible cationic urethane resin-containing low refractive index layer coating solution 1.

<Preparation of Water-Dispersible Cationic Urethane Resin-Containing Low Refractive Index Layer Coating Solution 9>

In a stirring vessel, 2.34 g of diallyl dimethyl ammonium chloride polymer (containing quaternary ammonium group) PAS H-1 L (weight average molecular weight of 8,500, 28% by mass aqueous solution, manufactured by NITTOBO MEDICAL CO., LTD.), 1.31 g of methyl diallylamine hydrochloride polymer (containing tertiary amine cation) PAS M-1 (weight average molecular weight of 20,000, 50% by mass aqueous solution, manufactured by NITTOBO MEDICAL CO., LTD.), and 28.1 g of boric acid (3% by mass aqueous solution) were mixed. 356.41 g of polymethylsilsesquioxane (PMSQ) sol (10% by mass aqueous dispersion) SP-1120 (H2O) (particle size 20 nm, manufactured by KONISHI CHEMICAL INC. CO., LTD.) was added thereto. This was heated to 40° C. with stirring. A mixed solution of 502.72 g of a 8% by mass aqueous solution of polyvinyl alcohol (PVA-224, average polymerization degree of 2400, saponification degree of 87 to 89 mol %, manufactured by KURARAY CO., LTD.), 5.5 g of a 30% by mass aqueous dispersion of water-dispersible cationic urethane resin (ester-based) (SUPERFLEX (registered trademark) 620, average particle size 20 nm, manufactured by DKS Co. Ltd.), 19.89 g of a 5% by mass aqueous solution of SOFTAZLINE (registered trademark) LMEB-R (manufactured by Kawaken Fine Chemicals Co., Ltd.) as a surfactant, and 83 g of pure water was added thereto, and stirred at 40° C., thereby obtaining a water-dispersible cationic urethane resin-containing low refractive index layer coating solution 9. A single layer manufactured by using the water-dispersible cationic urethane resin-containing low refractive index layer coating solution 9 had a refractive index identical to the case of using the water-dispersible cationic urethane resin-containing low refractive index layer coating solution 1.

<Preparation of Water-Dispersible Cationic Urethane Resin-Containing Low Refractive Index Layer Coating Solution 10>

In a stirring vessel, 26.5 g of methyl diallylamine hydrochloride polymer (containing tertiary amine cation) PAS M-1 (weight average molecular weight of 20,000, 50% by mass aqueous solution, manufactured by NITTOBO MEDICAL CO., LTD.), and 28.1 g of boric acid (3% by mass aqueous solution) were mixed. 356.41 g of polymethylsilsesquioxane (PMSQ) sol (10% by mass aqueous dispersion) SP-1120 (H2O) (particle size 20 nm, manufactured by KONISHI CHEMICAL INC. CO., LTD.) was added thereto. This was heated to 40° C. with stirring. A mixed solution of 195.0 g of a 8% by mass aqueous solution of polyvinyl alcohol (PVA-224, average polymerization degree of 2400, saponification degree of 87 to 89 mol %, manufactured by KURARAY CO., LTD.), 56.1 g of a 30% by mass aqueous dispersion of water-dispersible cationic urethane resin (ester-based) (SUPERFLEX (registered trademark) 620, average particle size 20 nm, manufactured by DKS Co. Ltd.), 19.89 g of a 5% by mass aqueous solution of SOFTAZLINE (registered trademark) LMEB-R (manufactured by Kawaken Fine Chemicals Co., Ltd.) as a surfactant, and 318 g of pure water was added thereto, and stirred at 40° C., thereby obtaining a water-dispersible cationic urethane resin-containing low refractive index layer coating solution 10. A single layer manufactured by using the water-dispersible cationic urethane resin-containing low refractive index layer coating solution 10 had a refractive index identical to the case of using the water-dispersible cationic urethane resin-containing low refractive index layer coating solution 1.

<Preparation of Water-Dispersible Cationic Urethane Resin-Containing Low Refractive Index Layer Coating Solution 11>

In a stirring vessel, 5.8 g of methyl diallylamine hydrochloride polymer (containing tertiary amine cation) PAS M-1 (weight average molecular weight of 20,000, 50% by mass aqueous solution, manufactured by NITTOBO MEDICAL CO., LTD.), and 28.1 g of boric acid (3% by mass aqueous solution) were mixed. 356.41 g of polymethylsilsesquioxane (PMSQ) sol (10% by mass aqueous dispersion) SP-1120 (H2O) (particle size 20 nm, manufactured by KONISHI CHEMICAL INC. CO., LTD.) was added thereto. This was heated to 40° C. with stirring. A mixed solution of 480.0 g of a 8% by mass aqueous solution of polyvinyl alcohol (PVA-224, average polymerization degree of 2400, saponification degree of 87 to 89 mol %, manufactured by KURARAY CO., LTD.), 12.3 g of a 30% by mass aqueous dispersion of water-dispersible cationic urethane resin (ester-based) (SUPERFLEX (registered trademark) 620, average particle size 20 nm, manufactured by DKS Co. Ltd.), 19.89 g of a 5% by mass aqueous solution of SOFTAZLINE (registered trademark) LMEB-R (manufactured by Kawaken Fine Chemicals Co., Ltd.) as a surfactant, and 98 g of pure water was added thereto, and stirred at 40° C., thereby obtaining a water-dispersible cationic urethane resin-containing low refractive index layer coating solution 11. A single layer manufactured by using the water-dispersible cationic urethane resin-containing low refractive index layer coating solution 11 had a refractive index identical to the case of using the water-dispersible cationic urethane resin-containing low refractive index layer coating solution 1.

<Preparation of Water-Dispersible Cationic Urethane Resin-Containing Low Refractive Index Layer Coating Solution 12>

In a stirring vessel, 5.8 g of methyl diallylamine hydrochloride polymer (containing tertiary amine cation) PAS M-1 (weight average molecular weight of 20,000, 50% by mass aqueous solution, manufactured by NITTOBO MEDICAL CO., LTD.), and 28.1 g of boric acid (3% by mass aqueous solution) were mixed. 356.41 g of polymethylsilsesquioxane (PMSQ) sol (10% by mass aqueous dispersion) SP-1120 (H2O) (particle size 20 nm, manufactured by KONISHI CHEMICAL INC. CO., LTD.) was added thereto. This was heated to 40° C. with stirring. A mixed solution of 480.0 g of a 8% by mass aqueous solution of polyvinyl alcohol (PVA-224, average polymerization degree of 2400, saponification degree of 87 to 89 mol %, manufactured by KURARAY CO., LTD.), 14.2 g of a 26% by mass aqueous dispersion of water-dispersible cationic urethane resin (carbonate-based) (SUPERFLEX (registered trademark) 650, average particle size 10 nm, manufactured by DKS Co. Ltd.), 19.89 g of a 5% by mass aqueous solution of SOFTAZLINE (registered trademark) LMEB-R (manufactured by Kawaken Fine Chemicals Co., Ltd.) as a surfactant, and 96 g of pure water was added thereto, and stirred at 40° C., thereby obtaining a water-dispersible cationic urethane resin-containing low refractive index layer coating solution 12. A single layer manufactured by using the water-dispersible cationic urethane resin-containing low refractive index layer coating solution 12 had a refractive index identical to the case of using the water-dispersible cationic urethane resin-containing low refractive index layer coating solution 1.

<Preparation of Water-Dispersible Cationic Urethane Resin-Containing Low Refractive Index Layer Coating Solution 13>

In a stirring vessel, 5.8 g of methyl diallylamine hydrochloride polymer (containing tertiary amine cation) PAS M-1 (weight average molecular weight of 20,000, 50% by mass aqueous solution, manufactured by NITTOBO MEDICAL CO., LTD.), and 28.1 g of boric acid (3% by mass aqueous solution) were mixed. 356.41 g of polymethylsilsesquioxane (PMSQ) sol (10% by mass aqueous dispersion)

SP-1120 (H2O) (particle size 20 nm, manufactured by KONISHI CHEMICAL INC. CO., LTD.) was added thereto. This was heated to 40° C. with stirring. A mixed solution of 480.0 g of a 8% by mass aqueous solution of polyvinyl alcohol (JP-45, average polymerization degree of 4500, manufactured by JAPAN VAM & POVAL CO., LTD.), 14.2 g of a 26% by mass aqueous dispersion of water-dispersible cationic urethane resin (carbonate-based) (SUPERFLEX (registered trademark) 650, average particle size 10 nm, manufactured by DKS Co. Ltd.), 19.89 g of a 5% by mass aqueous solution of SOFTAZLINE (registered trademark) LMEB-R (manufactured by Kawaken Fine Chemicals Co., Ltd.) as a surfactant, and 96 g of pure water was added thereto, and stirred at 40° C., thereby obtaining a water-dispersible cationic urethane resin-containing low refractive index layer coating solution 13. A single layer manufactured by using the water-dispersible cationic urethane resin-containing low refractive index layer coating solution 13 had a refractive index identical to the case of using the water-dispersible cationic urethane resin-containing low refractive index layer coating solution 1.

<Preparation of Water-Dispersible Cationic Urethane Resin-Containing Low Refractive Index Layer Coating Solution 14>

In a stirring vessel, 5.8 g of methyl diallylamine hydrochloride polymer (containing tertiary amine cation) PAS M-1 (weight average molecular weight of 20,000, 50% by mass aqueous solution, manufactured by NITTOBO MEDICAL CO., LTD.), and 28.1 g of boric acid (3% by mass aqueous solution) were mixed. 356.41 g of a 10% by mass aqueous solution of acidic colloidal silica (SNOWTEX (registered trademark) OXS, primary particle size: 5.4 nm, manufactured by Nissan Chemical Industries, Limited) was added thereto. This was heated to 40° C. with stirring. A mixed solution of 480.0 g of a 8% by mass aqueous solution of polyvinyl alcohol (JP-45, average polymerization degree of 4500, manufactured by JAPAN VAM & POVAL CO., LTD.), 14.2 g of a 26% by mass aqueous dispersion of water-dispersible cationic urethane resin (carbonate-based) (SUPERFLEX (registered trademark) 650, average particle size 10 nm, manufactured by DKS Co. Ltd.), 19.89 g of a 5% by mass aqueous solution of SOFTAZLINE (registered trademark) LMEB-R (manufactured by Kawaken Fine Chemicals Co., Ltd.) as a surfactant, and 96 g of pure water was added thereto, and stirred at 40° C., thereby obtaining a water-dispersible cationic urethane resin-containing low refractive index layer coating solution 14. A single layer manufactured by using the water-dispersible cationic urethane resin-containing low refractive index layer coating solution 14 had a refractive index of 1.50.

<Preparation of Water-Dispersible Cationic Urethane Resin-Containing Low Refractive Index Layer Coating Solution 15>

To a stirring vessel, 28.1 g of boric acid (3% by mass aqueous solution), and 356.41 g of polymethylsilsesquioxane (PMSQ) sol (10% by mass aqueous dispersion) SP-1120 (H2O) (particle size 20 nm, manufactured by KONISHI CHEMICAL INC. CO., LTD.) were added. This was heated to 40° C. with stirring. A mixed solution of 502.72 g of a 8% by mass aqueous solution of polyvinyl alcohol (PVA-224, average polymerization degree of 2400, saponification degree of 87 to 89 mol %, manufactured by KURARAY CO., LTD.), and 19.89 g of a 5% by mass aqueous solution of SOFTAZLINE (registered trademark) LMEB-R (manufactured by Kawaken Fine Chemicals Co., Ltd.) as a surfactant, and 93 g of pure water was added thereto, and stirred at 40° C., thereby obtaining a water-dispersible cationic urethane resin-containing low refractive index layer coating solution 15. A single layer manufactured by using the water-dispersible cationic urethane resin-containing low refractive index layer coating solution 15 had a refractive index identical to the case of using the water-dispersible cationic urethane resin-containing low refractive index layer coating solution 1.

<Preparation of Water-Dispersible Cationic Urethane Resin-Containing Low Refractive Index Layer Coating Solution 16>

To a stirring vessel, 28.1 g of boric acid (3% by mass aqueous solution), and 356.41 g of polymethylsilsesquioxane (PMSQ) sol (10% by mass aqueous dispersion) SP-1120 (H2O) (particle size 20 nm, manufactured by KONISHI CHEMICAL INC. CO., LTD.) were added. This was heated to 40° C. with stirring. A mixed solution of 502.72 g of a 8% by mass aqueous solution of polyvinyl alcohol (PVA-224, average polymerization degree of 2400, saponification degree of 87 to 89 mol %, manufactured by KURARAY CO., LTD.), 5.37 g of a 30% by mass aqueous dispersion of water-dispersible cationic urethane resin (ester-based) (SUPERFLEX (registered trademark) 620, average particle size 20 nm, manufactured by DKS Co. Ltd.), and 19.89 g of a 5% by mass aqueous solution of SOFTAZLINE (registered trademark) LMEB-R (manufactured by Kawaken Fine Chemicals Co., Ltd.) as a surfactant, and 88 g of pure water was added thereto, and stirred at 40° C., thereby obtaining a water-dispersible cationic urethane resin-containing low refractive index layer coating solution 16. A single layer manufactured by using the water-dispersible cationic urethane resin-containing low refractive index layer coating solution 16 had a refractive index identical to the case of using the water-dispersible cationic urethane resin-containing low refractive index layer coating solution 1.

<Preparation of Water-Dispersible Cationic Urethane Resin-Containing Low Refractive Index Layer Coating Solution 17>

To a stirring vessel, 28.1 g of boric acid (3% by mass aqueous solution) and 356.41 g of polymethylsilsesquioxane (PMSQ) sol (10% by mass aqueous dispersion) SP-1120 (H2O) (particle size 20 nm, manufactured by KONISHI CHEMICAL INC. CO., LTD.) were added. This was heated to 40° C. with stirring. A mixed solution of 502.72 g of a 8% by mass aqueous solution of polyvinyl alcohol (PVA-224, average polymerization degree of 2400, saponification degree of 87 to 89 mol %, manufactured by KURARAY CO., LTD.), 1.30 g of a 30% by mass aqueous dispersion of water-dispersible cationic urethane resin (ester-based) (SUPERFLEX (registered trademark) 620, average particle size 20 nm, manufactured by DKS Co. Ltd.), 19.89 g of a 5% by mass aqueous solution of SOFTAZLINE (registered trademark) LMEB-R (manufactured by Kawaken Fine Chemicals Co., Ltd.) as a surfactant, and 91 g of pure water was added thereto, and stirred at 40° C., thereby obtaining a water-dispersible cationic urethane resin-containing low refractive index layer coating solution 17. A single layer manufactured by using the water-dispersible cationic urethane resin-containing low refractive index layer coating solution 17 had a refractive index identical to the case of using the water-dispersible cationic urethane resin-containing low refractive index layer coating solution 1.

<Preparation of Water-Dispersible Cationic Urethane Resin-Containing Low Refractive Index Layer Coating Solution 18>

To a stirring vessel, 28.1 g of boric acid (3% by mass aqueous solution), and 356.41 g of polymethylsilsesquioxane (PMSQ) sol (10% by mass aqueous dispersion) SP-1120 (H2O) (particle size 20 nm, manufactured by KONISHI CHEMICAL INC. CO., LTD.) were added. This was heated to 40° C. with stirring. A mixed solution of 250.0 g of a 8% by mass aqueous solution of polyvinyl alcohol (PVA-224, average polymerization degree of 2400, saponification degree of 87 to 89 mol %, manufactured by KURARAY CO., LTD.), 83.57 g of a 30% by mass aqueous dispersion of water-dispersible cationic urethane resin (ester-based) (SUPERFLEX (registered trademark) 620, average particle size 20 nm, manufactured by DKS Co. Ltd.), 19.89 g of a 5% by mass aqueous solution of SOFTAZLINE (registered trademark) LMEB-R (manufactured by Kawaken Fine Chemicals Co., Ltd.) as a surfactant, and 262 g of pure water was added thereto, and stirred at 40° C., thereby obtaining a water-dispersible cationic urethane resin-containing low refractive index layer coating solution 18. A single layer manufactured by using the water-dispersible cationic urethane resin-containing low refractive index layer coating solution 18 had a refractive index identical to the case of using the water-dispersible cationic urethane resin-containing low refractive index layer coating solution 1.

<Preparation of Water-Dispersible Cationic Urethane Resin-Containing Low Refractive Index Layer Coating Solution 19>

In a stirring vessel, 0.33 g of methyl diallylamine hydrochloride polymer (containing tertiary amine cation) PAS M-1 (weight average molecular weight of 20,000, 50% by mass aqueous solution, manufactured by NITTOBO MEDICAL CO., LTD.), and 28.1 g of boric acid (3% by mass aqueous solution) were mixed. 356.41 g of polymethylsilsesquioxane (PMSQ) sol (10% by mass aqueous dispersion) SP-1120 (H2O) (particle size 20 nm, manufactured by KONISHI CHEMICAL INC. CO., LTD.) was added thereto. This was heated to 40° C. with stirring. A mixed solution of 502.7 g of 8% by mass aqueous solution of polyvinyl alcohol (PVA-224, average polymerization degree of 2400, saponification degree of 87 to 89 mol %, manufactured by KURARAY CO., LTD.), 19.89 g of a 5% by mass aqueous solution of SOFTAZLINE (registered trademark) LMEB-R (manufactured by Kawaken Fine Chemicals Co., Ltd.), and 93 g of pure water was added thereto, and stirred at 40° C., thereby obtaining a water-dispersible cationic urethane resin-containing low refractive index layer coating solution 19. A single layer manufactured by using the water-dispersible cationic urethane resin-containing low refractive index layer coating solution 19 had a refractive index identical to the case of using the water-dispersible cationic urethane resin-containing low refractive index layer coating solution 1.

<Preparation of Water-Dispersible Cationic Urethane Resin-Containing Low Refractive Index Layer Coating Solution 20>

In a stirring vessel, 0.33 g of methyl diallylamine hydrochloride polymer (containing tertiary amine cation) PAS M-1 (weight average molecular weight of 20,000, 50% by mass aqueous solution, manufactured by NITTOBO MEDICAL CO., LTD.), and 28.1 g of boric acid (3% by mass aqueous solution) were mixed. 356.41 g of polymethylsilsesquioxane (PMSQ) sol (10% by mass aqueous dispersion) SP-1120 (H2O) (particle size 20 nm, manufactured by KONISHI CHEMICAL INC. CO., LTD.) was added thereto. This was heated to 40° C. with stirring. A mixed solution of 502.7 g of 8% by mass aqueous solution of polyvinyl alcohol (PVA-224, average polymerization degree of 2400, saponification degree of 87 to 89 mol %, manufactured by KURARAY CO., LTD.), 3.5 g of a 45% by mass aqueous dispersion of water-dispersible nonionic urethane resin (ester-based) (SUPERFLEX (registered trademark) 500 M, average particle size 140 nm, manufactured by DKS Co. Ltd.), 19.89 g of a 5% by mass aqueous solution of SOFTAZLINE (registered trademark) LMEB-R (manufactured by Kawaken Fine Chemicals Co., Ltd.), and 89 g of pure water was added thereto, and stirred at 40° C., thereby obtaining a water-dispersible cationic urethane resin-containing low refractive index layer coating solution 20. A single layer manufactured by using the water-dispersible cationic urethane resin-containing low refractive index layer coating solution 20 had a refractive index identical to the case of using the water-dispersible cationic urethane resin-containing low refractive index layer coating solution 1.

<Preparation of Water-Dispersible Cationic Urethane Resin-Containing Low Refractive Index Layer Coating Solution 21>

9.18 parts by mass of a 23.5% by mass aqueous solution of polyaluminum chloride (manufactured by TAM CHEMICAL CO., LTD., Takibine (registered trademark) #1500), 215 parts by mass of a 10% by mass aqueous solution of colloidal silica (SNOWTEX (registered trademark) OXS, average particle size: 5.4 nm, manufactured by Nissan Chemical Industries, Limited), 23 parts by mass of a 3.0% by mass aqueous solution of boric acid, and 8.4 parts by mass of a 3.3% by mass aqueous solution of sodium acetate were mixed and dispersed, and the preparation was finished to 400 parts by mass with pure water, thereby preparing silicon oxide dispersion.

Then, the silicon oxide dispersion was heated to 45° C., and 8 parts by mass of pure water, 188 parts by mass of a 4.0% by mass solution of unmodified polyvinyl alcohol (PVA235, average polymerization degree: 3500, saponification degree: 88%, manufactured by KURARAY CO., LTD.), and 12.5 parts by mass of a 30.0% by mass solution of cationic emulsion (UW-319 SX, average particle size: 50 nm, Tg: 10° C., manufactured by TAISEI FINE CHEMICAL CO., LTD.) were added and mixed, and then 1.90 parts by mass of a 5% by mass aqueous solution of NIKKOL (registered trademark) CA-3475 V (manufactured by Nikko Chemicals Co., Ltd.) as a cationic surfactant was further added, thereby obtaining a water-dispersible cationic urethane resin-containing low refractive index layer coating solution 21. A single layer manufactured by using the water-dispersible cationic urethane resin-containing low refractive index layer coating solution 21 had a refractive index identical to the case of using the water-dispersible cationic urethane resin-containing low refractive index layer coating solution 14.

Example 1

Using a slide hopper coating apparatus capable of coating 19 multiple layers, the high refractive index layer coating solution 1, the low refractive index layer coating solution 1, and the water-dispersible cationic urethane resin-containing low refractive index layer coating solution 1 as prepared above were adjusted to 40° C., respectively. On a polyethylene terephthalate film (A4300, a product manufactured by TOYOBO CO., LTD.: double-sided easy adhesive film) having a width of 160 mm and a thickness of 50 μm which is a substrate heated to 40° C., simultaneous multilayer coating of total 19 layers was performed, in an alternate manner except that the lowest layer and the uppermost layer are the low refractive index layer, the 19th layer from the substrate is the water-dispersible cationic urethane resin-containing low refractive index layer, so that the dried film thickness of the low refractive index layer and the water-dispersible cationic urethane resin-containing low refractive index layer is 150 nm, respectively, and that of the high refractive index layer is 130 nm, respectively. Immediately after coating, cold air at 10° C. was blown to set the product (thickening).

After completing setting (thickening), hot air at 60° C. was blown and drying was performed, thereby manufacturing the optical reflective film of Example 1 composed of total 19 layers.

Then, the measurement (confirmation) of a film thickness was performed by cutting an optical reflective film sample, and measuring the abundance of a high refractive index material ($CeO_2$ in Example 1), and a low refractive index material ($SiO_2$, PMSQ in the water-dispersible cationic urethane resin-containing layer) on the cut surface with an XPS surface analyzer, thereby confirming that the film thickness of each of the layers was secured.

Example 2

An optical reflective film was manufactured in the same manner as in Example 1, except that the first layer from the substrate, instead of the 19th layer from the substrate is the water-dispersible cationic urethane resin-containing low refractive index layer in Example 1.

Examples 3 to 14 and Comparative Examples 1 to 6

Optical reflective films were manufactured in the same manner as in Example 2, except that the coating solutions for forming the water-dispersible cationic urethane resin-containing low refractive index layer were changed from the water-dispersible cationic urethane resin-containing low refractive index layer coating solution 1 to the water-dispersible cationic urethane resin-containing low refractive index layer coating solutions 2 to 13, and 15 to 20 as manufactured above, as shown in Table 1 below, respectively in Example 2.

Example 15

An optical reflective film was manufactured in the same manner as in Example 14, except that the coating solution for forming the high refractive index layer was changed from the high refractive index layer coating solution 1 to the high refractive index layer coating solution 2 as manufactured above, in Example 14.

Example 16

An optical reflective film was manufactured in the same manner as in Example 15, except that the coating solution for forming the water-dispersible cationic urethane resin-containing low refractive index layer was changed from the water-dispersible cationic urethane resin-containing low refractive index layer coating solution 13 to the water-dispersible cationic urethane resin-containing low refractive index layer coating solution 14 as manufactured above, in Example 15.

Example 17

An optical reflective film was manufactured in the same manner as in Example 16, except that the first layer and the 19th layer from the substrate were the water-dispersible cationic urethane resin-containing low refractive index layer in Example 16.

Example 18

An optical reflective film was manufactured in the same manner as in Example 16, except that all low refractive index layers were the water-dispersible cationic urethane resin-containing low refractive index layer, in Example 16.

Comparative Example 7

An optical reflective film was manufactured in the same manner as in Comparative Example 6, except that the coating solution for forming the water-dispersible cationic urethane resin-containing low refractive index layer was changed from the water-dispersible cationic urethane resin-containing low refractive index layer coating solution 20 to the water-dispersible cationic urethane resin-containing low refractive index layer coating solution 21 as manufactured above, and also, the coating solution for forming the high refractive index layer was changed from the high refractive index layer coating solution 1 to the high refractive index layer coating solution 3 as manufactured above, in Comparative Example 6.

Comparative Example 8

An optical reflective film was manufactured in the same manner as in Comparative Example 7, except that all low refractive index layers were the water-dispersible cationic urethane resin-containing low refractive index layer, in Comparative Example 7.

<<Evaluation>>

<Measurement of Haze>

For the optical reflective film samples manufactured in the above Examples and Comparative Examples, a Haze Meters (manufactured by NIPPON DENSHOKU INDUSTRIES CO., LTD., NDH5000) was used to measure the haze in accordance with JIS K7136: 2000. The haze value of the optical reflective film was preferably 3.0% or less.

(Weatherability Test)

For the optical reflective film as manufactured in the Examples and Comparative Examples, an adhesive layer was formed on the surface of the dielectric multilayer film laminated on the substrate which was on the opposite side to the substrate. Specifically, the following coating solutions for forming an adhesive layer was applied on a silicone release surface of NS23MA, a separator manufactured by Nakamoto Packs Co., Ltd. with a comma coater so that the dried film thickness was 10 μm, and dried at 90° C. for 1 minute to form an adhesive layer. On this adhesive layer, the film having a dielectric multilayer film formed thereon was adhered, thereby forming an adhesive layer on the dielectric multilayer film.

Preparation of Coating Solution for Forming Adhesive Layer 100 parts by mass of Coponyl N-2147 (solid content of 35% by mass, manufactured by The Nippon Synthetic Chemical Industry Co., Ltd.), 2.1 parts by mass of TINUVIN (registered trademark) 477 (solid content of 80% by mass, manufactured by BASF Japan Ltd.) as an UV absorber, 5 parts by mass of Coronate (registered trademark) L55E (solid content of 55% by mass, manufactured by TOSOH CORPORATION) as a curing agent were mixed to prepare a coating solution for forming an adhesive layer.

Thereafter, SP-PET (release film) as a separator was peeled off from the sample, and the optical reflective film was adhered on glass of 6 cm×12 cm through the adhesive layer. Then, using Xenon Weather Meter (manufactured by Suga Test Instruments Co., Ltd., SX-75), the glass side was disposed so as to be on the light incident side, and the test was performed for 5,000 hours in accordance with JIS K 7350-2.

(Color Tone Change)

A spectrophotometer (using an integrating sphere, manufactured by Hitachi, Ltd., U-4000 type) was used to measure a transmission spectrum, and a color difference (ΔE) before and after the weatherability test was calculated, thereby determining an average value of 6 test samples. It can be said in practical use that when ΔE is less than 3.0, weatherability is secured.

(Evaluation of Cracks)

The sample after the weatherability test was observed with the naked eye, and the cracks were evaluated according to the following criteria. In the following criteria, 3 to 6 can be used without problems in practical use.

6: Neither cracks nor swelling were not seen,
5: Cracks were not seen at all, and swelling was seen on the surface, but no problem in practical use,
4: microcracks were seen at the edge of the film through the loupe, but no problem in practical use,
3: microcracks were seen at the edge of the film with the naked eye,
2: cracks occurred even on the center of the film, which was problematic in practical use,
1: cracks occurred on the entire film, which was problematic in practical use.

<Measurement of Near Infrared Reflectance>

Using U-4000 type (using an integrating sphere, manufactured by Hitachi, Ltd.) as a spectrophotometer, the reflectance was measured in the region of 800 to 1400 nm of the optical reflective film of each of the Examples and the Comparative Examples, and the maximum value was determined, which was set as the near infrared reflectance. It was confirmed that a good near infrared reflectance of 70% or more can be obtained in any optical reflective film of each of the Examples and the Comparative Examples.

The evaluation results are shown in the following Table 1:

TABLE 1

| | | | Water-dispersible cationic urethane resin-containing layer | | | | | | High refractive index layer |
|---|---|---|---|---|---|---|---|---|---|
| | Position | | Water-dispersible resin | | | Cationic polymer | | Water-soluble resin average | Refractive index | refractive index |
| | (of total 19 layers, from substrate side) | Coating solution | Resin | Resin skeleton | Content (% by mass) | Amino group (cation) | Mass ratio | polymerization degree | adjusting agent | adjusting agent |
| Example 1 | 19th layer | 1 | Cationic urethane resin | Ester | 2 | Tertiary | 0.1 | 2400 | PMSQ | $CeO_2$ |
| Example 2 | First layer | 1 | Cationic urethane resin | Ester | 2 | Tertiary | 0.1 | 2400 | PMSQ | $CeO_2$ |
| Example 3 | First layer | 2 | Cationic urethane resin | Ester | 1 | Tertiary | 0.1 | 2400 | PMSQ | $CeO_2$ |
| Example 4 | First layer | 3 | Cationic urethane resin | Ester | 25 | Tertiary | 0.1 | 2400 | PMSQ | $CeO_2$ |
| Example 5 | First layer | 4 | Cationic urethane resin | Ester | 2 | Tertiary | 4 | 2400 | PMSQ | $CeO_2$ |
| Example 6 | First layer | 5 | Cationic urethane resin | Ester | 2 | Tertiary | 0.2 | 2400 | PMSQ | $CeO_2$ |
| Example 7 | First layer | 6 | Cationic urethane resin | Ester | 2 | Tertiary | 2 | 2400 | PMSQ | $CeO_2$ |
| Example 8 | First layer | 7 | Cationic urethane resin | Ester | 2 | Tertiary | 0.8 | 2400 | PMSQ | $CeO_2$ |
| Example 9 | First layer | 8 | Cationic urethane resin | Ester | 2 | Quaternary | 0.8 | 2400 | PMSQ | $CeO_2$ |
| Example 10 | First layer | 9 | Cationic urethane resin | Ester | 2 | Tertiary/Quaternary | 0.8 | 2400 | PMSQ | $CeO_2$ |
| Example 11 | First layer | 10 | Cationic urethane resin | Ester | 20 | Tertiary | 0.8 | 2400 | PMSQ | $CeO_2$ |
| Example 12 | First layer | 11 | Cationic urethane resin | Ester | 4.4 | Tertiary | 0.8 | 2400 | PMSQ | $CeO_2$ |
| Example 13 | First layer | 12 | Cationic urethane resin | Carbonate | 4.4 | Tertiary | 0.8 | 2400 | PMSQ | $CeO_2$ |
| Example 14 | First layer | 13 | Cationic urethane resin | Carbonate | 4.4 | Tertiary | 0.8 | 4500 | PMSQ | $CeO_2$ |
| Example 15 | First layer | 13 | Cationic urethane resin | Carbonate | 4.4 | Tertiary | 0.8 | 4500 | PMSQ | $ZrO_2$ |
| Example 16 | First layer | 14 | Cationic urethane resin | Carbonate | 4.4 | Tertiary | 0.8 | 4500 | $SiO_2$ | $ZrO_2$ |
| Example 17 | First layer, 19th layer | 14 | Cationic urethane resin | Carbonate | 4.4 | Tertiary | 0.8 | 4500 | $SiO_2$ | $ZrO_2$ |
| Example 18 | All low refractive index layers | 14 | Cationic urethane resin | Carbonate | 4.4 | Tertiary | 0.8 | 4500 | $SiO_2$ | $ZrO_2$ |
| Comparative Example 1 | First layer | 15 | — | — | — | — | — | 2400 | PMSQ | $CeO_2$ |
| Comparative Example 2 | First layer | 16 | Cationic urethane resin | Ester | 2 | — | — | 2400 | PMSQ | $CeO_2$ |

TABLE 1-continued

| | | | | | | | | | | |
|---|---|---|---|---|---|---|---|---|---|---|
| Comparative Example 3 | First layer | 17 | Cationic urethane resin | Ester | 0.5 | — | — | 2400 | PMSQ | CeO$_2$ |
| Comparative Example 4 | First layer | 18 | Cationic urethane resin | Ester | 30 | — | — | 2400 | PMSQ | CeO$_2$ |
| Comparative Example 5 | First layer | 19 | — | — | — | Tertiary | — | 2400 | PMSQ | CeO$_2$ |
| Comparative Example 6 | First layer | 20 | Nonionic urethane resin | Ester | 2 | Tertiary | 0.1 | 2400 | PMSQ | CeO$_2$ |
| Comparative Example 7 | First layer | 21 | Acrylic resin | | 10 | — | — | 3500 | SiO$_2$ | TiO$_2$ |
| Comparative Example 8 | All low refractive index layers | 21 | Acrylic resin | | 10 | — | — | 3500 | SiO$_2$ | TiO$_2$ |

| | | Weatherability test | |
|---|---|---|---|
| | Haze (%) | ΔE | Crack |
| Example 1 | 2.4 | 2.4 | 3 |
| Example 2 | 2.4 | 2.4 | 3 |
| Example 3 | 2.5 | 2.0 | 3 |
| Example 4 | 2.5 | 2.8 | 4 |
| Example 5 | 2.2 | 1.1 | 3 |
| Example 6 | 2.0 | 1.1 | 3 |
| Example 7 | 1.8 | 1.1 | 3 |
| Example 8 | 1.6 | 1.1 | 3 |
| Example 9 | 1.6 | 1.2 | 3 |
| Example 10 | 1.6 | 1.2 | 3 |
| Example 11 | 1.7 | 1.5 | 4 |
| Example 12 | 1.7 | 1.1 | 4 |
| Example 13 | 1.7 | 1.1 | 5 |
| Example 14 | 1.5 | 1.1 | 5 |
| Example 15 | 1.5 | 1.1 | 5 |
| Example 16 | 1.3 | 1.1 | 5 |
| Example 17 | 1.3 | 1.1 | 6 |
| Example 18 | 1.3 | 1.1 | 6 |
| Comparative Example 1 | 4.6 | 1.1 | 1 |
| Comparative Example 2 | 4.5 | 4.6 | 3 |
| Comparative Example 3 | 3.5 | 1.2 | 1 |
| Comparative Example 4 | 4.5 | 5.6 | 3 |
| Comparative Example 5 | 2.0 | 1.2 | 1 |
| Comparative Example 6 | 3.2 | 3.5 | 3 |
| Comparative Example 7 | 2.4 | 1.2 | 2 |
| Comparative Example 8 | 5.5 | 1.2 | 2 |

From the results of the above Table 1, it was found that the optical reflective films of Examples 1 to 18 including a water-dispersible cationic urethane resin-containing layer, containing a water-soluble resin; a refractive index adjusting agent; a water-dispersible cationic urethane resin; and a cationic polymer having a tertiary amino group or a cation (salt) thereof or a quaternary ammonium group have coloring prevention and crack prevention which are compatible with each other, and have excellent weatherability, as compared with the optical reflective film of Comparative Examples 1 to 8. When introducing the water-dispersible cationic urethane resin as in Comparative Examples 2 to 4, cracks occurred less, but the film was colored by light irradiation, as compared with the optical reflective film of Comparative Example 1 which did not use a cationic urethane resin. When using the nonionic urethane resin as in Comparative Example 6, a sufficient coloring prevention effect cannot be obtained.

In addition, when comparing Examples 2, 5 to 8, in the optical reflective films of Examples 5 to 8 in which the content of the cationic polymer in the water-dispersible cationic urethane resin-containing layer was in a range of 0.2 to 4.0 by a solid content, relative to the water-dispersible cationic urethane resin, haze and coloring after the weatherability tests were suppressed, and in Examples 6 to 8 having the content in a range of 0.2 to 2.0, the haze was further reduced.

Among Examples 2 to 4, the optical reflective film of Example 2 in which the content of the water-dispersible cationic urethane resin in the water-dispersible cationic urethane resin-containing layer was 2 to 20% by mass had an excellent effect of suppressing the haze and coloring after the weatherability tests.

In addition, when the water-dispersible cationic urethane resin is the carbonate-based urethane resin as in Examples 13 to 18, the effect of suppressing cracks is greater. When the average polymerization degree of the water-soluble resin is 4000 to 6000 as in Examples 14 to 18, it was found that the optical reflective film having suppressed haze can be obtained even in the case of having the water-dispersible cationic urethane resin in a plurality of layers.

The present application is based on Japanese Patent Application No. 2016-071520 filed on Mar. 31, 2016, the disclosure of which is incorporated herein by reference in its entirety.

The invention claimed is:

1. An optical reflective film, comprising:
   a substrate; and
   a dielectric multilayer film formed by alternately laminating a second refractive index layer which has a second refractive index and a first refractive index layer which has a first refractive index higher than the second refractive index, disposed on one surface of the substrate,
   wherein at least one layer of the second refractive index layer and the first refractive index layer is a water-dispersible cationic urethane resin-containing layer, containing: a water-soluble resin; a refractive index adjusting agent; a water-dispersible cationic urethane resin; and a cationic polymer having a tertiary amino group or a cation thereof or a quaternary ammonium group.

2. The optical reflective film according to claim 1, wherein the cationic polymer having a tertiary amino group or a cation thereof or a quaternary ammonium group has a mass ratio of 0.2 to 4.0 by a solid content ratio, relative to the water-dispersible cationic urethane resin.

3. The optical reflective film according to claim 1, wherein the water-dispersible cationic urethane resin has a content of 2 to 20% by mass in the water-dispersible cationic urethane resin-containing layer.

4. The optical reflective film according to claim 1, wherein the water-dispersible cationic urethane resin is a carbonate-based urethane resin.

5. The optical reflective film according to claim 1, wherein the water-soluble resin has an average polymerization degree of 4000 to 6000.

6. The optical reflective film according to claim 1, wherein at least one layer of the first refractive index layers is the water-dispersible cationic urethane resin-containing layer containing zirconium oxide particles as the refractive index adjusting agent.

7. The optical reflective film according to claim 1, wherein at least one layer of the second refractive index layers is the water-dispersible cationic urethane resin-containing layer containing silicon oxide particles as the refractive index adjusting agent.

8. The optical reflective film according to claim 1, wherein a plurality of the second refractive index layers are each the water-dispersible cationic urethane resin-containing layer.

* * * * *